Figure 1:
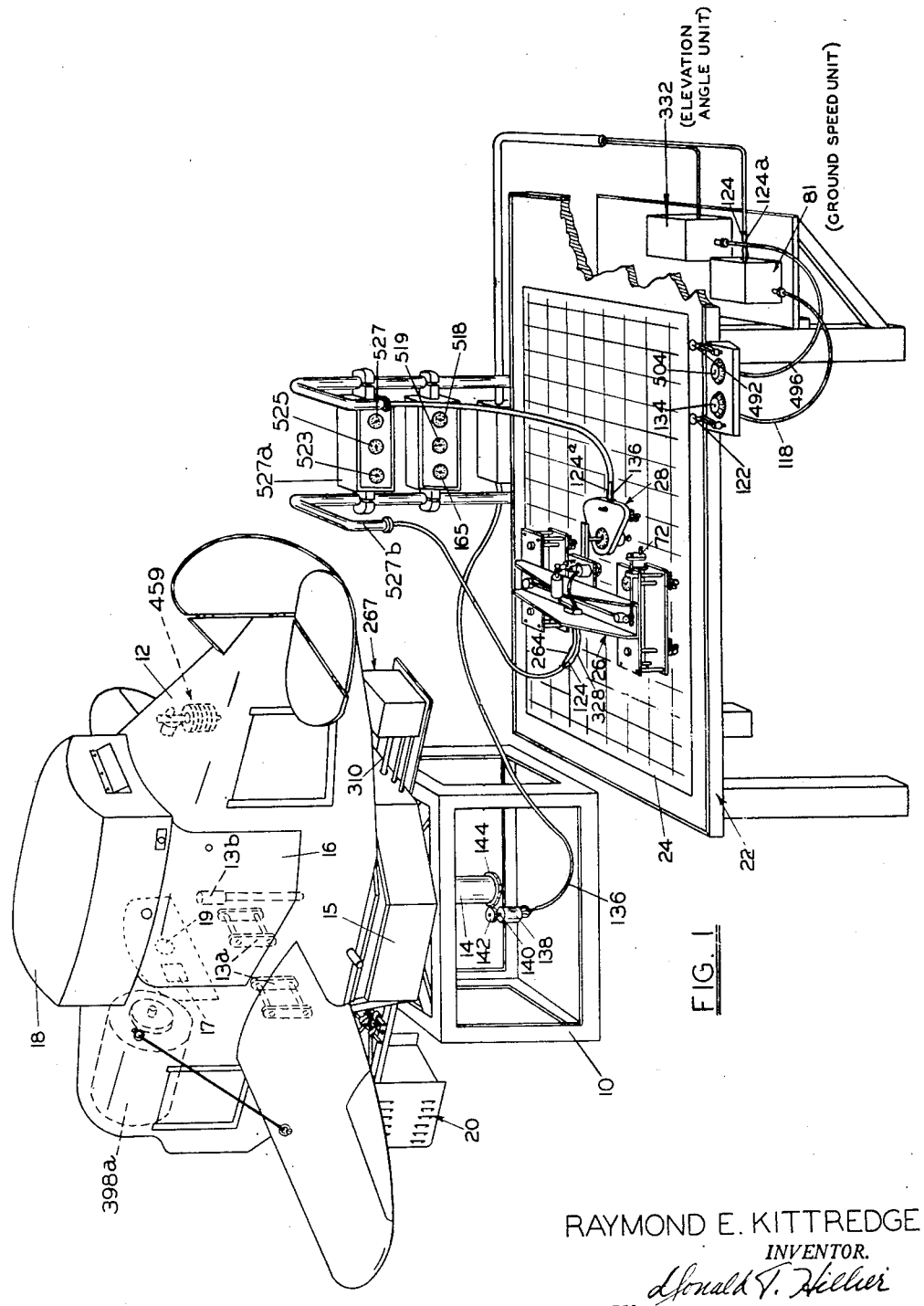

March 19, 1946.  R. E. KITTREDGE  2,396,857
TRAINING DEVICE
Filed March 20, 1944  8 Sheets-Sheet 1

RAYMOND E. KITTREDGE
INVENTOR.

BY
ATTORNEYS.

RAYMOND E. KITTREDGE
*INVENTOR.*
BY Donald T. Hillier
Philip S. Hopkins
ATTORNEYS.

March 19, 1946. R. E. KITTREDGE 2,396,857
TRAINING DEVICE
Filed March 20, 1944 8 Sheets-Sheet 3

RAYMOND E. KITTREDGE
*INVENTOR.*
BY Donald T. Hillier
Philip S. Hopkins
ATTORNEYS.

March 19, 1946. R. E. KITTREDGE 2,396,857
TRAINING DEVICE
Filed March 20, 1944 8 Sheets-Sheet 4

RAYMOND E. KITTREDGE
*INVENTOR.*
BY Donald T. Hillier
Philip S. Hopkins
ATTORNEYS.

RAYMOND E. KITTREDGE
INVENTOR.

March 19, 1946.  R. E. KITTREDGE  2,396,857
TRAINING DEVICE
Filed March 20, 1944  8 Sheets-Sheet 7

RAYMOND E. KITTREDGE
INVENTOR.
BY Donald T. Hillier
Philip S. Hopkins
ATTORNEYS.

March 19, 1946.   R. E. KITTREDGE   2,396,857
TRAINING DEVICE
Filed March 20, 1944   8 Sheets-Sheet 8
FIG. 8
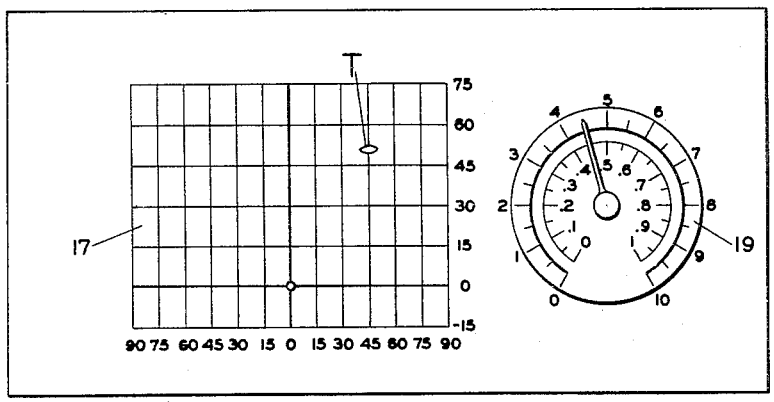
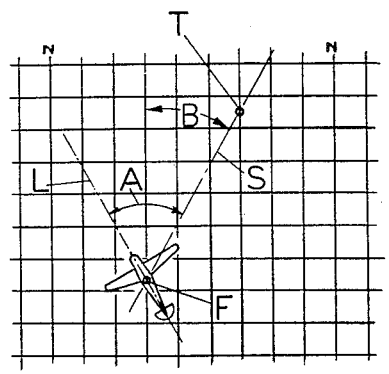
FIG. 9
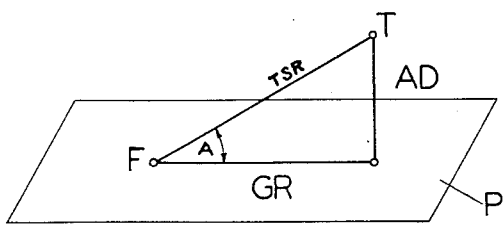
FIG. 10
RAYMOND E. KITTREDGE
*INVENTOR.*
BY
ATTORNEYS.

Patented Mar. 19, 1946

2,396,857

UNITED STATES PATENT OFFICE 2,396,857

TRAINING DEVICE

Raymond E. Kittredge, Binghamton, N. Y., assignor to Link Aviation Devices, Inc., Binghamton, N. Y., a corporation of New York Application March 20, 1944, Serial No. 527,248

10 Claims. (Cl. 35—25)

This invention relates to a device for use in training personnel in the use of radar equipment, and more particularly, in the training of personnel to fly an airplane by means of radar.

In order that the general nature of this invention may be better understood, reference is made to Fig. 8 which is a schematic view of one kind of radar screen or C scope 17 and range meter 19 to which the pilot of a combat plane may refer when piloting the plane by means of radar.

Fig. 8 shows that the pilot's screen and range meter are side by side. The pilot's screen is commonly referred to as the C scope and has upon its face a plurality of horizontal as well as a plurality of vertical lines. A scale is associated with each set of lines, and it will be seen that the central vertical line is designated 0, while the lines to either side of this zero line are successively designated by increasing increments of 15 up to 90.

The horizontal lines are likewise designated in increasing increments of 15 beginning with the designation of minus 15 for the lowermost line and continuing up to plus 75.

The range meter is provided with a needle adapted to move over two scales one above the other graduated from zero to ten. Means are provided whereby the scales are selectively used, the upper scale being used to indicate ranges of over one mile in increments of even miles, and the lower scale being used to indicate ranges of less than one mile in increments of tenths of miles.

One typical use of radar is in a fighter plane which is attempting to intercept a target plane. It is this particular situation which the preferred embodiment of my invention will be described as simulating, although it will be readily apparent that the invention may readily be applied to the simulation of all types of navigation by radar.

In order that the objects of my invention may be more readily understood the geometrical relationships between a fighter plane and a target plane should be borne in mind. Inasmuch as it is assumed that it is the fighter which is equipped with radar, it is the position of the target relation to the fighter which is considered.

Three factors will locate the position of the target relative to the fighter:

1. *Target azimuth angle,* which is the angle between the fighter's longitudinal axis and the projection of the line of sight from the fighter to the target on the plane through the lateral and longitudinal axes of the fighter. Azimuth is measured from the end of the projection of the longitudinal axis corresponding to the nose of the plane clockwise or counterclockwise through 180°, but the specific type of radar indicating equipment being considered only indicates azimuth up to 90° left or right. If azimuth is greater than 90° the target is not shown upon the scope. However, my invention is applicable to other types of radar receiving equipment as will be later understood.

This definition is illustrated in Fig. 9 where the line L designates the direction of flight and the fighter's (F) longitudinal axis; the line S designates the projection of the line of sight from the fighter F to the target (T) on the plane through the lateral and longitudinal axes of the fighter; and the angle A designates the azimuth.

2. *Target elevation angle,* which is the angle between the line of sight from the fighter to the target and the plane through the lateral and longitudinal axes of the fighter.

This definition is illustrated in Fig. 10 where P illustrates the plane of the lateral and longitudinal axes of the fighter (F) for the case when the fighter is in level flight, TSR is the line of sight from the fighter to the target (T) and A is the target elevation angle.

By virtue of the foregoing definitions, movements of the fighter about its axes will change the azimuth and elevation angles.

3. *Target slant range,* which is the distance along the line of sight from the fighter (F) to the target (T). In Fig. 10 target slant range is illustrated by the line TSR.

It is these three factors which are given by the C scope and range meter carried by a real fighter plane equipped with radar. In real radar carried by a fighter plane the plane is equipped with means which cause the image on the scope to be positioned according to the first defined azimuth and elevation angles of the target. Also, the radar equipment causes the range meter to register in accordance with the distance of the target from the fighter. The radar indicating means therefore indicate the azimuth, elevation angle and range of the target. The radar equipment carried by the fighter, in and of itself forms no part of this invention and therefore is not herein shown in detail. However, sufficient description of the parts of the radar equipment used with my invention will be given hereinafter to enable those skilled in the field of radar to practice this invention.

When the radar equipment carried by a plane is set in operation, if a target plane be within the field of operation of the equipment, an image such as that shown at T in Fig. 8 appears upon the screen. This image is produced by parts of the real radar equipment which may form a part of my invention, as later more fully explained.

The azimuth of the target as previously defined is conveyed to the pilot of the radar equipped plane by the position of the image on the screen relative to the vertical line marked zero. If the image appeared as shown in Fig. 1 the azimuth of the target would be 30 degrees right. The target elevation angle is indicated to the pilot by the position of the image relative to the scale at the right of the screen, and in the illustrated case is plus 50 degrees. At the same time the range meter shows the slant range of the target from the fighter—in the illustrated case the slant range being four and one-half miles. If the radar equipment continues in operation, and the target remains within the scope of operation thereof, the position of the target relative to the fighter in terms of azimuth, elevation angle and range is continuously given by the scope and range meter. The position of the target relative to the axes of the fighter as shown by the scope and meter changes in response to the following movements of the target:

(1) Changes in the latitude of the target.
(2) Changes in the longitude of the target.
(3) Changes in the altitude of the target.

Furthermore, the position of the target relative to the axes of the fighter as shown by the radar indicating means changes in response to the following movements of the fighter:

(4) Changes in the latitude of the fighter.
(5) Changes in the longitude of the fighter.
(6) Changes in the altitude of the fighter.
(7) Changes in the position of the fighter about its vertical axes.
(8) Changes in the position of the fighter about its longitudinal axis.
(9) Changes in the position of the fighter about its transverse axis.

As far as the first six mentioned factors are concerned it is deemed unnecessary to show in detail how changes in each of these factors affect the position of the target relative to the fighter in terms of the three basic concepts defined above. It is clear that the relative positions of two points in space in terms of azimuth, angular difference in height and distance may change as either point changes its position in any one of the three possible directions of movement, or combinations thereof. Considering the last three mentioned factors, it is clear that a change in the position of the fighter about its vertical axis, i. e., a turning of the fighter, will produce a change in the azimuth of the target. As far as factor 8 is concerned, let us assume that the target is 90° from the nose of the fighter, i. e., directly abeam, and that the fighter changes its position about its longitudinal axis—that is, it banks. It is clear that the target elevation angle will be changed by an amount equal to the bank. And as far as the last mentioned factor is concerned, in the event the target is directly ahead of the fighter, i. e., its azimuth is zero, a change in the fighters' position about its lateral axis—i. e., a diving or a climbing thereof, will produce a change in the target elevation angle by an amount equal to the change about the lateral axis.

The preferred embodiment of this invention includes an aviation trainer which comprises a fuselage universally and rotatably mounted upon a stationary base. This trainer in the preferred embodiment of our invention represents the fighter plane. The fuselage may bank, climb, dive and turn indefinitely in either direction, these fuselage movements being accomplished by the student in the fuselage who, by means of the rudder pedals in the fuselage which actuate a turning motor, may cause the fuselage to turn in either direction.

By means of the control column or stick which is also in the fuselage the student may cause the fuselage to bank, climb and pitch by means of the banking, pitching and climbing bellows which are actuated by the movements of the control column. All of these movements of the fuselage in and of themselves form no part of the present invention, and for a complete disclosure thereof reference is made to United States Patents 1,825,462 and 2,099,857.

However, the instant invention adds to the interior of the fuselage at a place visible to the student, the previously described radar indicating means, viz., the C scope and range meter. Other types of radar equipment and radar indicating means may be readily adapted for use with my invention. Hereinafter, when a radar equipped plane is referred to in the description, a plane equipped with the illustrated type of radar indicating means is intended.

Upon a table remote from the trainer fuselage is a recorder which represents the target, and this recorder may under the control of an operator be made to move in any direction and at varying rates across a chart on the table. Therefore the direction and speed of the target's movement is simulated by the direction and speed of the target recorder's movements.

Also mounted upon the same chart and table is a recorder which represents the fighter. This recorder is of the type described in United States Patent 2,179,663. Its movement over the chart is automatically directionally responsive to changes in the heading of the trainer and its speed of movement varies according to the assumed speed of the trainer. The direction and speed of the fighter's movements are therefore simulated by the direction and speed of this second recorder's movements.

The position of the target recorder on the chart at all times represents the assumed latitude and longitude of the target, while the position of the fighter recorder on the chart at all times represents the assumed latitude and longitude of the fighter. The record made by the recorder 28 shows the assumed course over the ground of the Link trainer. This record, in conjunction with a record made by the recorder 26, may be used in post analysis of the problem "flown" by the student pilot in the Link trainer.

These two recorders are mechanically coupled and connected to the radar indicating means so that a movement of either one relative to the other, through an intermediate system of electrical and mechanical elements, produces the same changes in the position of the image on the radar scope and in the range meter's reading that corresponding real changes in the latitude and longitude of a real target and of a real flighter would produce on the radar scope and meter in the fighter.

A manual control whereby the operator may set into the mechanism the assumed altitude of the target is provided, and the assumed altitude of the fighter is automatically changed and introduced into the apparatus as will be later pointed out. As the assumed altitude of the fighter or of the target is changed, through electrical and mechanical means the radar indicating means are changed just as are the real radar indicating means carried by a real fighter when corresponding real changes in target or fighter altitude occur.

Further, means are provided to change the radar indicating means in response to a turning, banking and pitching of the fuselage of the trainer, caused by movements of the controls in the trainer, in simulation of the changes which occur in the radar indicating means carried by a real fighter when the fighter makes corresponding movements. It should be noted that the factors of target azimuth and target elevation angle may change in response to the turning, banking, climbing and diving of the plane equipped with radar, and that the radar indicating means respond to these movements. This is because radar equipment is designed to indicate the position of the target relative to the longitudinal, lateral and vertical axes of the radar equipped plane. Latitude, longitude and altitude of the radar equipped plane also are determining factors, but as far as the target is concerned, the only determining factors are latitude, longitude and altitude. In other words, the target may be considered to be a point having location only.

It is the main object of this invention to produce means whereby the radar indicating means installed in a grounded trainer may be made to respond to the above-outlined nine determining factors in simulation of the responses of radar indicating means carried by a plane in actual flight to target and to radar equipped plane movements. With my invention it is possible for the student in the trainer to control the trainer, in response to the signals indicated on the screen in the trainer, just as a real pilot in a plane would control the plane in response to corresponding signals. Thus it is possible for the student to control the Link trainer so that the image remains on the zero azimuth and zero elevation angle lines in Fig. 8, just as the pilot in a real plane so keeps the image on his screen when he desires to intercept an enemy craft. Other simulated situations, it will be understood by those skilled in the art, may be practiced by the use of my invention.

It is a closely related object of this invention to provide a device for training in navigation by radar without using real radar propagation and reception equipment.

Numerous other related objects will become apparent as the description proceeds.

In order that the nature of my invention may be better understood reference is made to the accompanying drawings wherein a preferred embodiment is shown. In the figures, Fig. 1 shows a grounded aviation trainer of the type disclosed in United States Patents 1,825,462 and 2,099,857 together with a table upon which is mounted a chart and the target and fighter recorders. Other associated parts of the invention are also shown in this figure.

Figure 2:
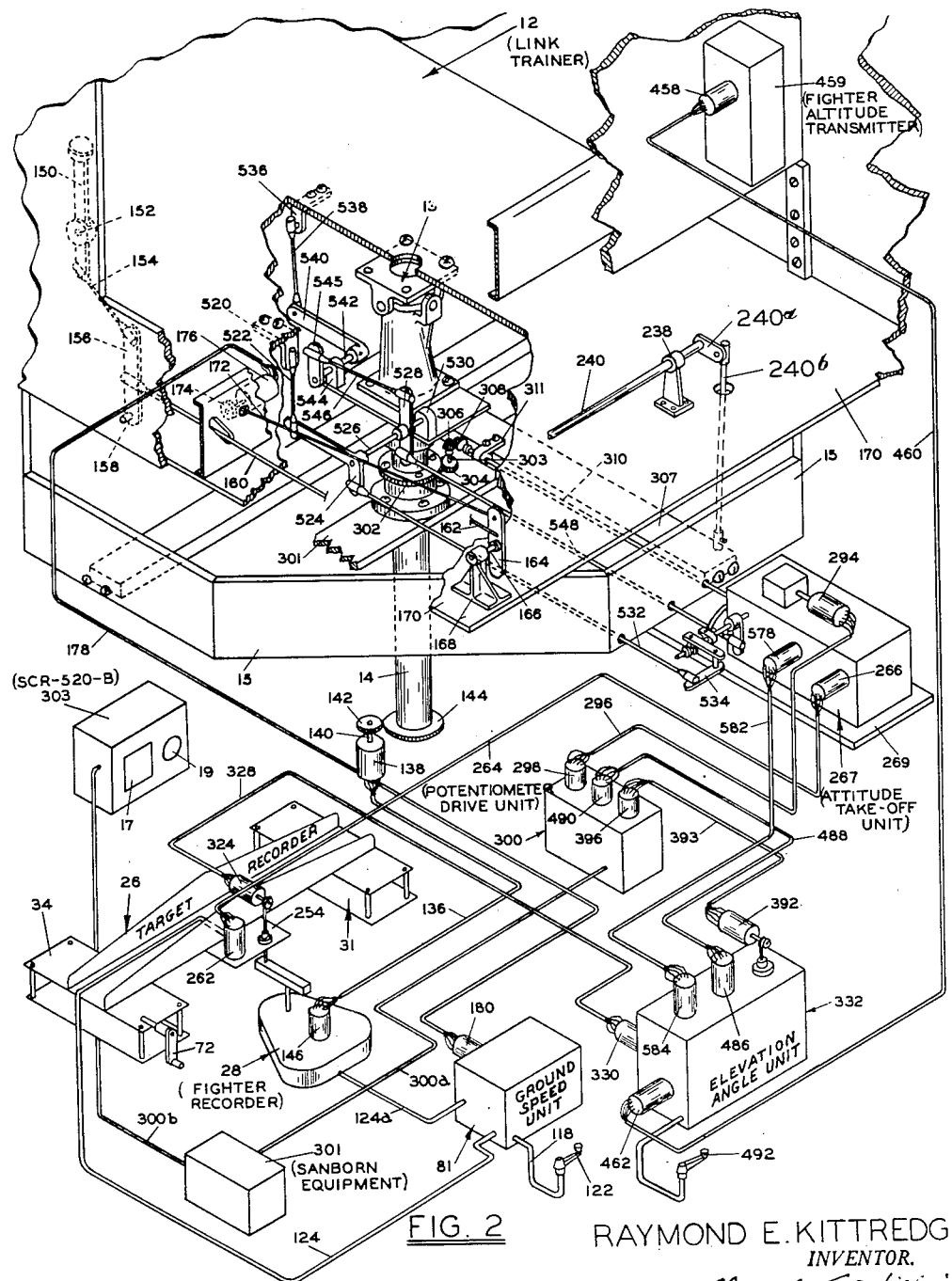

Fig. 2 shows in detail certain of the structural parts of my invention and the general outline of the whole invention in diagrammatic form.

Figure 2A:
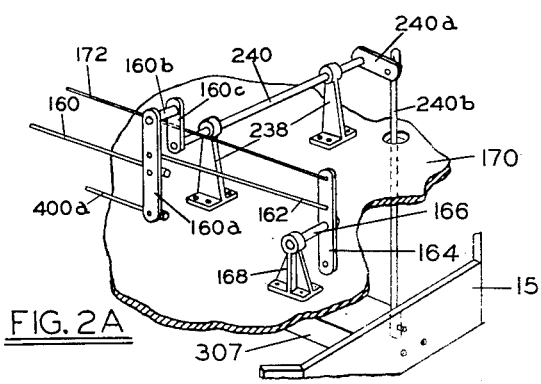

Fig. 2a discloses a detail of the apparatus.

Figure 3:
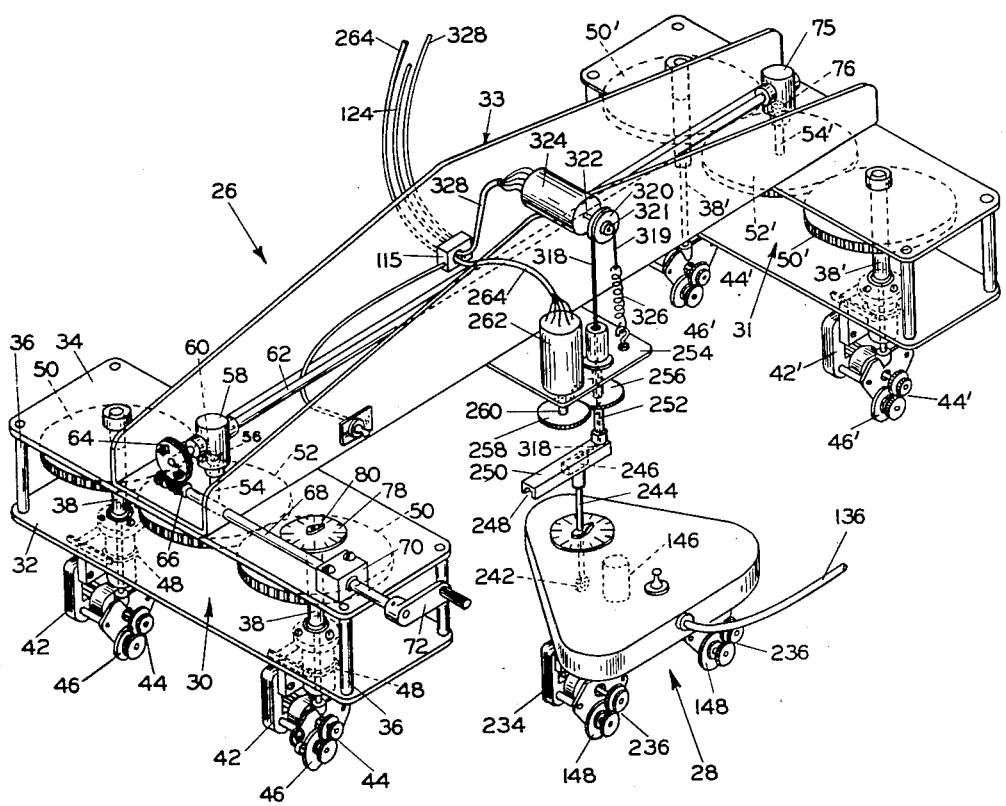

Fig. 3 is a detailed view of the target and fighter recorders, the means connecting the same, and means for determining ground range as well as one of the components of azimuth.

Figures 4, 4A:
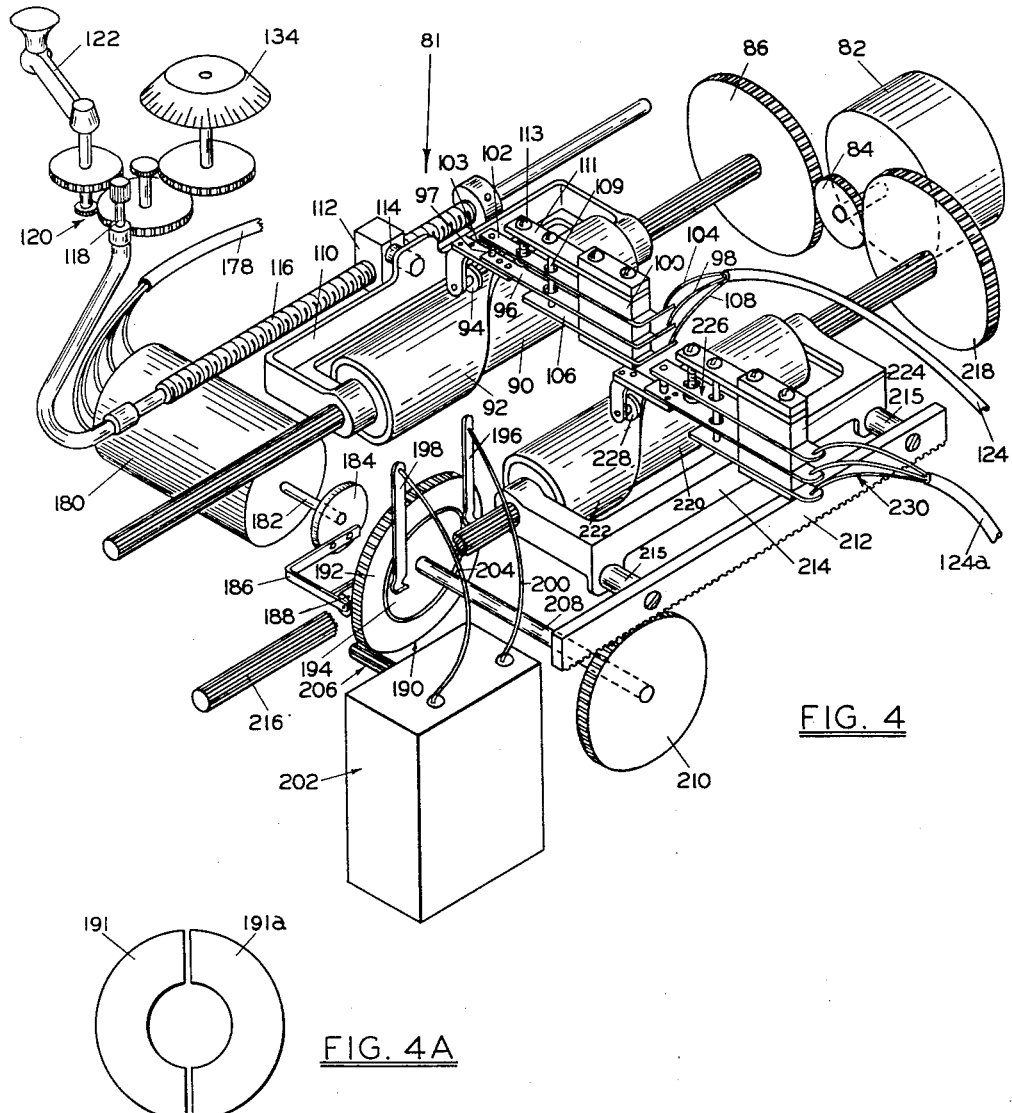

Fig. 4 discloses the detailed means for varying the speed of movement of the target and fighter recorders over the chart according to the assumed speeds of the target and fighter.

Fig. 4A discloses a detailed part of my invention.

Figure 5:
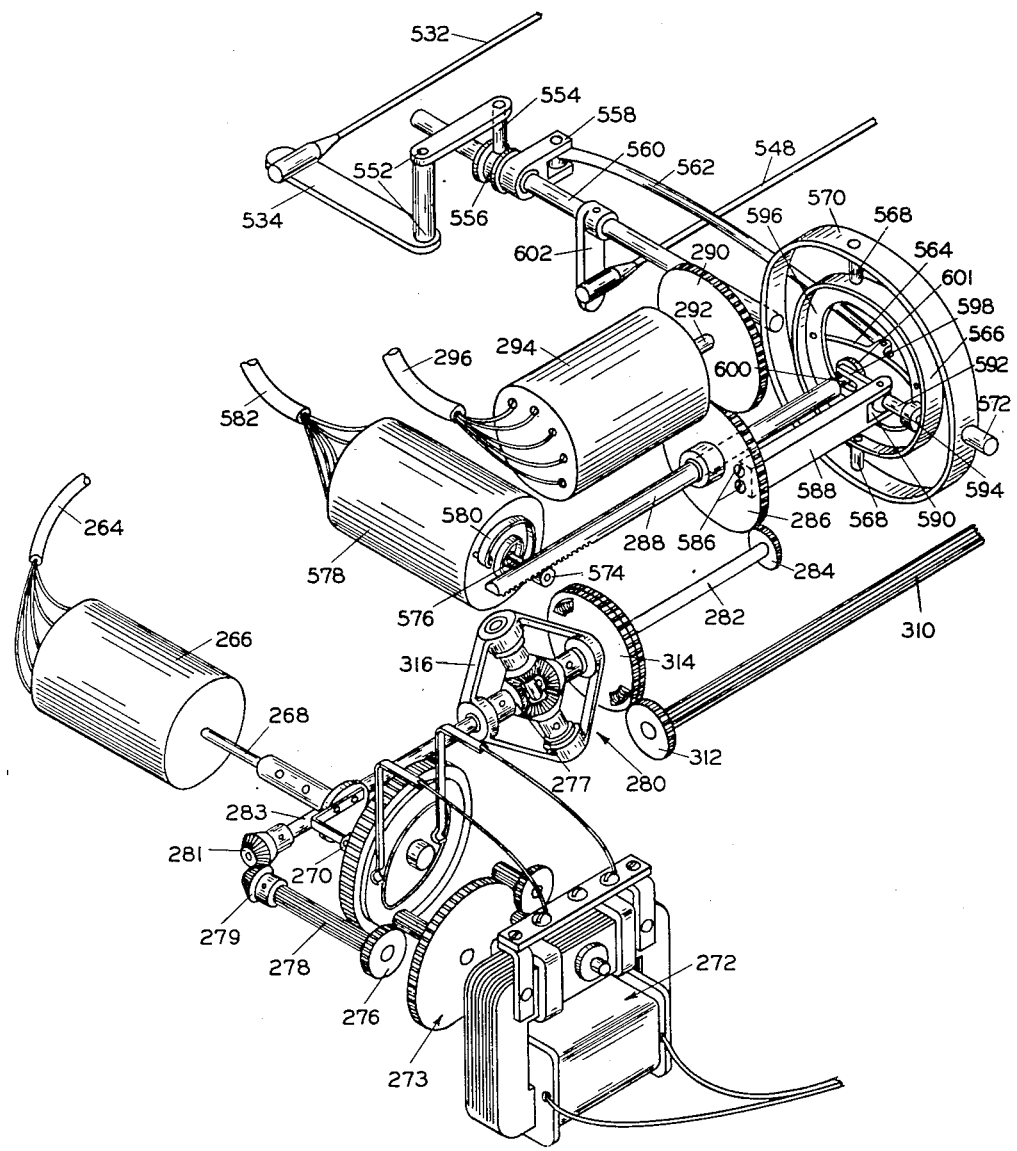

Fig. 5 shows the attitude correction unit which comprises means for correcting elevation angle in response to the movements of the fighter about its three axes and for changing the azimuth indication in response to turning of the trainer about its vertical axis.

Figure 6:
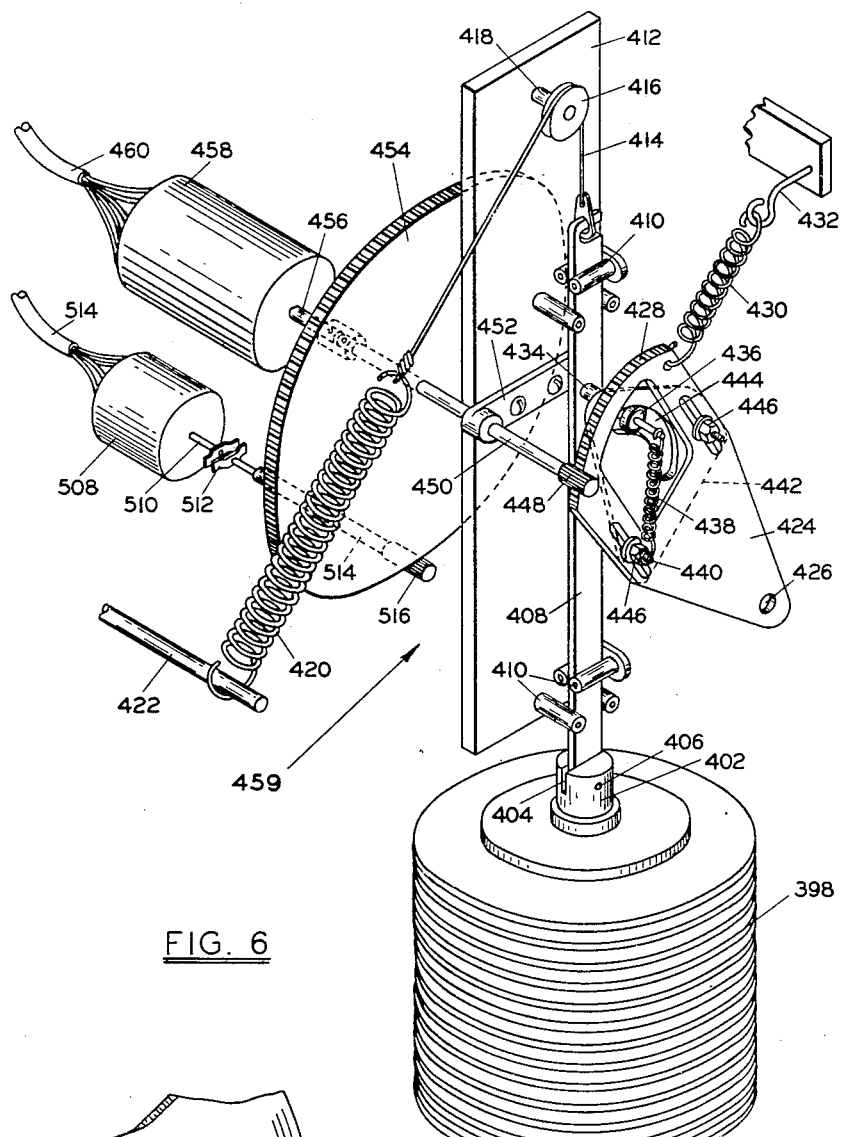
Figure 6:
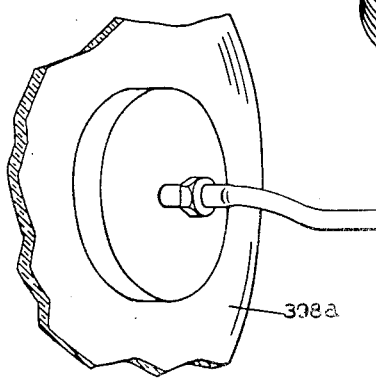

Fig. 6 discloses the means used to introduce into the apparatus the factor of altitude of the fighter.

Figure 7:
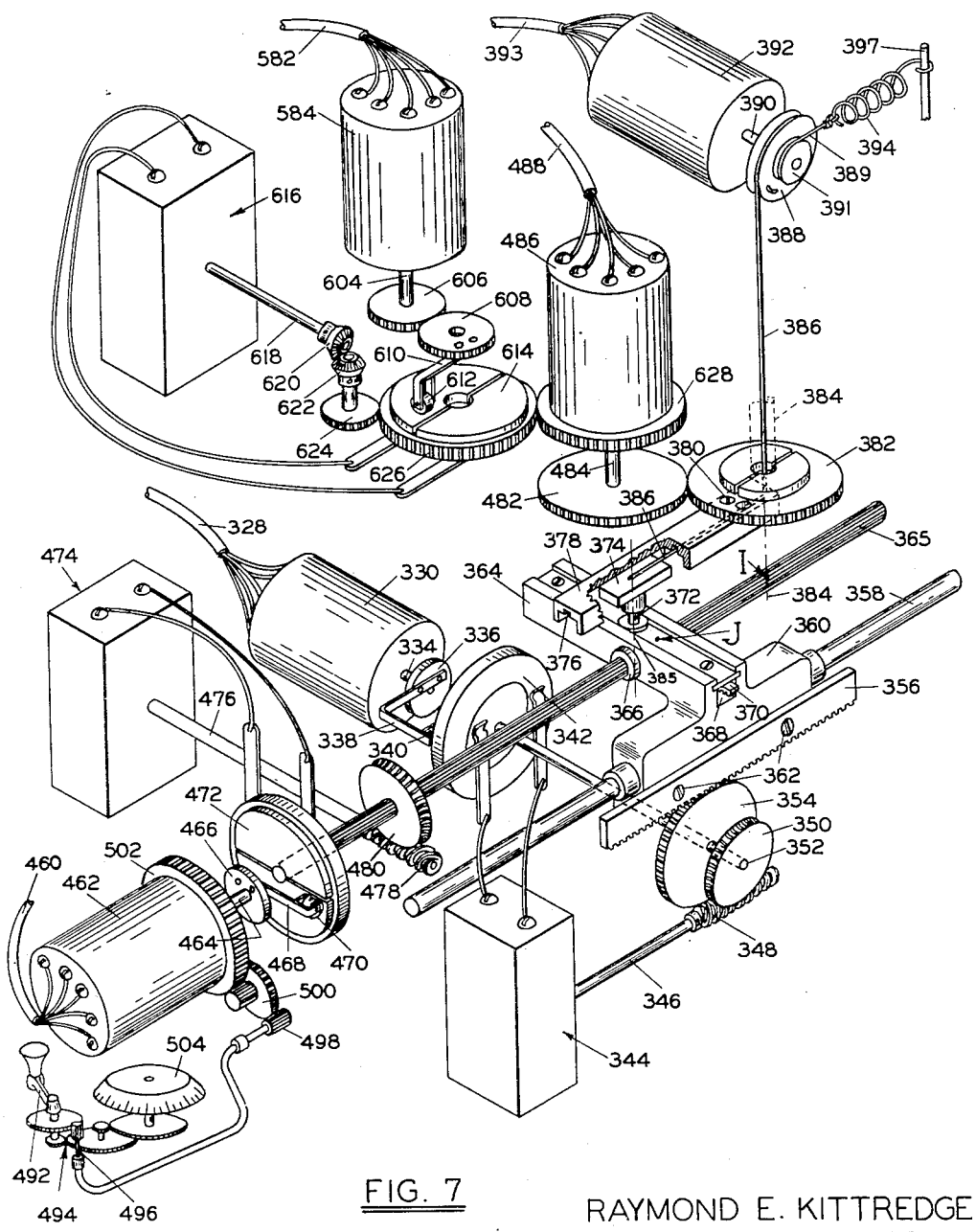

Fig. 7 discloses means for integrating the factors of ground range and altitude difference to produce the factors of altitude angle and slant range and means for modifying the altitude angle to produce the elevation angle.

Fig. 8 discloses the radar indicating means within the trainer fuselage.

Figs. 9 and 10 illustrate some of the basic geometrical relationships between a radar equipped plane and a target plane.

*The fighter*

Referring now to Fig. 1, it will be seen that my invention includes a trainer of the type generally referred to as a Link trainer. This trainer is assumed, in the illustrated embodiment of my invention, to be a radar equipped fighter. This trainer comprises a stationary base 10 and a fuselage 12. The fuselage 12 is mounted upon a universal joint 13 shown in Fig. 2 which in turn rests upon a main central spindle 14 which is rotatably mounted in base 10. Octagon 15 is attached to fuselage 12. The fuselage 12 is sufficiently large to accommodate a student who may enter the fuselage by means of door 16 and a seat (not shown) is provided within the fuselage for the student. A hood 18 may be used to completely encompass the student within the trainer so that in the "flying" of the same he must rely completely upon the instruments which are in the trainer in a position corresponding to the position of the instruments in a real plane. The radar indicating C scope is designated 17 and the range meter 19.

Within the fuselage 12 are a pair of rudder pedals 13a which simulate the rudder pedals of a real plane. By a manipulation of these rudder pedals the student may energize the turning motor 20 to cause the trainer fuselage 12 to rotate relative to base 10 in either direction about its vertical axis just as the pilot of a real plane may correspondingly cause the plane to turn. Also, within the fuselage 12 there is provided a control stick or column 13b by which the student may cause the fuselage 12 to dive or climb or bank relative to base 10 in either direction in simulation of the manner that a pilot causes a real plane to perform corresponding movements. The turning of the fuselage 12 is possible because of the rotatable mounting of spindle 14 in base 10, while the climbing, diving and banking are made possible by means of the mounting of the fuselage 12 upon the previously-mentioned universal joint 13.

The previously-mentioned United States Patents 1,825,462 and 2,099,857 disclose in detail means for causing the fuselage 12 to turn, climb, dive and bank in simulation of the movements of a real plane in actual flight and, therefore, the movements of the rudder pedals and control stick by the student which control the position of fuselage 12 do not constitute a part of my invention except when combined in the manner to be later described for affecting the indications of the radar indicating C scope and range meter.

Also shown in Fig. 1 is a table 22 upon which is placed a chart 24 which preferably has engraved thereupon suitable lines of latitude and longitude.

The target recorder

Seen upon chart 24 is the target recorder designated generally 26 and the fighter recorder designated generally 28. These recorders are shown in detail in Fig. 3, to which reference is now made.

The target recorder comprises two substantially identical parallel members designated generally 30 and 31 connected by a central elevated transverse member 33. This arrangement permits the fighter recorder 28 to move under target recorder 26. Members 30 and 31 and their associated parts are substantially identical so only a detailed description of member 30 will be given. Member 30 comprises two horizontal plates 32 and 34 held apart by spacers 36. Two vertical shafts 38 are rotatably mounted in and held by the plates 32 and 34. Mounted upon the lower end of each of the vertical shafts is a synchronous motor 42 each of which through a reduction gear train 44 drives a propelling wheel 46 which rests upon the chart 24 shown in Fig. 1. A set of conventional slip rings and brushes 48 is associated with each of the shafts 38 to permit indefinite rotation of shafts 38, motors 42, gear trains 44 and propelling wheels 46 and at the same time keep the motors 42 connected to their remote source of electric power.

Rigidly affixed to the top of each of vertical shafts 38 is a large spur gear 50 which meshes at all times with a middle spur gear 52. This large gear is rigidly affixed to the vertical stub shaft 54 which is held by plate 34 to correctly position gear 52 at all times. Rigidly fixed to shaft 54 is bevel gear 56 within housing 58 and meshing with gear 56 is another bevel gear 60 which is rigidly affixed to horizontal shaft 62. Rigidly affixed upon the outside end of horizontal shaft 62 is anti-backlash worm gear 64 which is driven by worm 66 formed rigidly affixed to horizontal shaft 68. A bearing contained in block 70 which is rigidly affixed to plate 34 is provided to properly position horizontal shaft 68 and a crank 72 is affixed to the end of horizontal shaft 68.

By virtue of the foregoing arrangement, it will be understood that by turning crank 72, which it is contemplated shall be done manually by the instructor, the middle gear 52 may be rotated and consequently gears 50, vertical shafts 38, motors 42, gear trains 44 and propelling wheels 46 will be turned about their vertical axes. The instructor may therefore position propelling wheels 46 in any direction through 360°.

Horizontal shaft 62 is driven by the bevel gears 56 and 60. Upon the other end of this shaft is another bevel gear (not shown) in housing 75 which cooperates with bevel gear 76 which, through a system (just like the previously-described system) comprising vertical shaft 54', intermediate gear 52', driving two other gears 50' mounted upon vertical shafts 38 each carrying a motor 42', set of gear trains 44' and propelling wheels 46', may rotate the corresponding parts to position the propelling wheels in any given direction.

Whenever crank 72 is turned, therefore, all four of the main vertical shafts 38 and 38' are turned as are the driving motors 42 and 42' and propelling wheels carried by each of these shafts. The driving motors and propelling wheels turn in the same direction and through the same angle so that their directions are at all times parallel. The instructor may, therefore, cause the motors 42 and 42' to drive the target recorder in any direction across the chart 24. The given direction in which the target recorder is moving at any instant may be ascertained by a reference to the azimuth scale 78 rigidly affixed upon plate 34 and the pointer 80 rigidly affixed to the upper end of shaft 38. The instructor may, by a reference to the azimuth indicating means 78, 80 cause the target recorder to move in the direction in which it is assumed that the target plane is moving.

Fig. 4 shows the means used to govern the rate of travel of the target recorder, which rate may be varied according to the assumed ground speed of the target plane. The mechanism shown in Fig. 4 is referred to in the art as the ground speed unit, and is designated in Fig. 1 by 81.

In Fig. 4 is shown a constant speed motor numbered 82 upon the output shaft of which is rigidly fixed spur gear 84 driving a larger gear 86 which is rigidly affixed to splined shaft 88. Drum 90 is mounted upon splined shaft 88 in a manner to permit it to slide along the shaft and to rotate with shaft 88. Rigidly affixed upon this drum 90 is an upraised cam portion 92 as shown. The upraised portion 92 begins at the right end of drum 90 and progressively encircles the drum until it completely surrounds it at its left end as shown in Fig. 4. A roller cam follower 94 is carried by contact arm 96 which is connected to wire 98. Arm 96 has a contact point 97. This contact strip is carried by insulating block 100 which is suitably fixed to a supporting means (not shown). A second contact strip 102 having a contact point 103 is connected to a second wire 104 and a third contact strip 106 is connected to wire 108. Contact strip 106 is connected by means of pin 109 to member 111 which carries screw 113. The drum 90 and cam portion 92 which is affixed thereto are moved along splined shaft 88 by means of bracket 110 which in turn is moved by the nut 112 and stub shaft 114 whenever threaded shaft 116 is turned by means of the flexible cable 118, gear train 120 and crank 122.

The three wires 98, 104 and 108 are contained in the cable 124 which, as shown in Figs. 2 and 3, connects with the target recorder junction box 115. The three wires connect to each of the driving motors 42 and 42' through the slip rings although the detailed connections are not shown in Fig. 3.

Wire 98 is connected to a source of alternating current while wire 108 is connected to a source of direct current. Wire 104 is a common return. Whenever roller cam follower 94 is upon the upraised cam 92 contact is made between points 97 and 103 and by means of elements 96, 98, 102, 103 and 104 the source of alternating current energizes the motors 42 and 42' and the target recorder moves across the chart. However, the instant roller cam follower 94 moves off cam 92 and contacts drum 90, contacts 97 and 103 break and strip 102 contacts screw 113, so by means of elements 104, 108, 109, 111 and 113 the source of direct current is connected to the motors 42 and 42'. This connection immediately stops these motors, thereby preventing coasting of the target recorder.

By means of crank 122 the instructor may position the drum 90 and cam 92 along splined shaft 88 to cause the synchronous motors 42 to run varying proportions of the time and, consequently, the instructor may govern the distance traveled by the target recorder in a given length of time over chart 24. The assumed rate of travel of the target plane is proportional to the distance traveled by the target recorder in a given time interval.

A graduated dial 134 is geared to the crank 122 as shown. This dial 134 is preferably calibrated in miles per hour and by referring to it and a suitable pointer (not shown) the instructor may cause the target recorder to move over the chart at the desired rate, thereby simulating the assumed rate of travel of the target plane.

By means of the previously-described mechanism the instructor may therefore cause the target recorder to move over the chart in any desired direction corresponding to the assumed direction of flight of the target plane. Also, the instructor may vary the rate of travel of the target recorder to simulate different assumed rates of travel of the target.

*The fighter recorder*

Also seen in Fig. 3 is the fighter recorder 28. This recorder is of the type described in United States Patent 2,179,663 and as shown in Fig. 2, this recorder includes a teletorque receiver 146. A teletorque transmitter 138 is provided, and upon the input shaft 140 of this transmitter is fixedly mounted a gear 142 which meshes with gear 144 affixed to the main spindle 14 to rotate therewith.

Teletorque transmitter 138 is connected through cable 136 to the teletorque receiver 146 which is a part of recorder 28. Teletorque receiver 146 also has a central shaft (not shown) referred to as its output shaft, and a gear is likewise rigidly affixed upon this shaft. The teletorque transmitter 138 and teletorque receiver 146 are of the well-known type wherein a rotation of the shaft of the teletorque transmitter through a given angle produces a rotation of the central shaft of the teletorque receiver through the same angle. By selectively connecting the wires connecting the teletorques, the output shaft of the receiver may be made to turn in either direction. When the input shaft of the transmitter is turned in one direction, the output shaft of the receiver always turns in a given direction. A reversal of the direction of rotation of the input shaft of the transmitter results in a reversal of the direction of rotation of the output shaft of the receiver. Whenever the terms "teletorque transmitter" and "teletorque receiver" are hereinafter used the corresponding parts of a system of this type are designated.

As described in the United States Patent 2,179,663 whenever fighter 12 is rotated through a given angle the rotation of gear 144 causes a rotation of the input shaft 140 of the teletorque transmitter 138. Consequently, a rotation of the output shaft of teletorque receiver 146 results, and by means of suitable gearing the propelling wheels 148 of the fighter recorder 28 are turned through the same angle and in the same direction as the rotation of fighter 12. Therefore, fighter recorder 28 is directionally responsive to the rotation of fuselage 12 so that the direction of its travel over chart 24 corresponds at all times to the assumed direction of flight of the fighter plane 12.

Means will now be described for governing the rate of travel of fighter recorder 28 over the chart 24 according to the assumed speed of the fighter 12.

Referring now to a plane in actual flight, it will be realized that the rate of travel of the plane depends upon two factors, first, the throttle setting and secondly, the attitude of the plane, that is, whether it be climbing or diving. The farther open the throttle the faster the plane's movement and, of course, a diving of the plane increases its speed while a climbing has the opposite effect.

Referring now to Figs. 2 and 2A it will be seen that inside fuselage 12 is a throttle lever 150 pivoted at the point 152 and having connected at its lower end a link 154 which in turn is pivotally connected to the upper end of arm 156 pivoted at 158. Link 160 is connected to the pitch action walking beam 160a which is pivoted upon the stub shaft 160b carried by arm 160c which in turn is affixed upon the left end of shaft 240. Shaft 240 is rotatably mounted in brackets 238 which are affixed to the floor of fuselage 10. Arm 240a is affixed upon the right end of shaft 240 and depending link 240b pivotally attached to arm 240a has its lower end affixed to a portion of the revolving octagon 15. The pitch action walking beam 160a has pivotally connected thereto the link 162 which in turn is connected to lever 164 as shown. Lever 164 is rigidly affixed to shaft 166 which is pivotally mounted in bracket 168 which in turn is rigidly affixed to the bottom 170 of fuselage 12.

The just described arrangement of parts is disclosed in U. S. Patent 2,099,857, and it is sufficient to know that upon a pushing to the left in Fig. 2, to which figure reference is now made, of throttle lever 150, which action simulates the opening of the throttle in a plane in actual flight, the upper end of lever 164 moves to the right. A movement of the throttle lever in the opposite direction reverses the direction of movement of lever 164. A diving of fuselage 12 causes the upper end of lever 164 to move to the right in Fig. 2, while a climbing of fuselage 12 produces opposite motion of the lever. It will be seen in that figure that to the upper end of lever 164 is connected cable 172 which is wound around a pulley 174 which is rigidly mounted upon the spring biased input shaft of the teletorque transmitter 176. This teletorque transmitter, which is known as the fighter ground speed transmitting teletorque, is connected by means of the electrical cable 178 in Fig. 2 to the fighter ground speed receiver teletorque 180 which is a part of the ground speed unit 81 shown in detail in Fig. 4.

Reference is now made to Fig. 4 which discloses the ground speed unit designated in Fig. 1 by 81. In Fig. 4 it will be seen that the fighter ground speed receiver teletorque 180 has the usual output shaft 182 and a disc 184 affixed thereupon. Rigidly attached to the disc is bracket 186 which carries a contact roller 188 which bears against the unseen side of the circular contact carrying member 190. The unseen side of the member 190 carries two 180° segments which are shown in Fig. 4A and numbered 191 and 191a. These 180° segments are insulated from one another, but their ends are close together as shown so that roller 188 may contact both simultaneously if the roller is appropriately positioned with respect thereto. Each of the 180° segments is connected electrically to one of the circular plates 192 or 194 upon the other side of disc 190. The circular plates are also insulated from one another. A brush 196 is at all times in contact with plate 192 while brush 198 likewise contacts plate 194 at all times. A conductor 200 connects brush 196 with one terminal of the reversible follow-up motor 202 while conductor 204 connects brush 198 with the other terminal of this motor. Whenever the roller 188 is moved by receiver teletorque 180 so that it is in contact with only one of the 180° segments motor 202 is energized and turns in a given direction and through a gear train and the gear 206 the motor drives disc 190 in a given direction until contact roller 188 contacts both of the 180° segments, at which instant motor 202 stops. On the other hand, if contact roller 188 is moved by means of teletorque receiver 180 until it contacts only the other 180° disc motor 202 is energized and turns in the opposite direction thereby turning disc 190 in the opposite direction from the first cited case until contact roller 188 again contacts both of the 180° segments, at which instant the motor 202 stops. This arrangement is, therefore, of a conventional follow-up type.

It will therefore be realized that if the output shaft 182 of fighter ground speed receiver teletorque 180 is turned in one direction motor 202 rotates contact plate 190 in a given direction through the same angle as the rotation of the shaft 182, while if the output shaft of the receiver teletorque is rotated in the opposite direction motor 202 is energized to rotate disc 190 in the opposite direction and through a corresponding angle.

This means of energizing a follow-up motor to drive a disc as a result of the rotation of the output shaft of a receiver teletorque is used because of the limited torque of a teletorque receiver. Such an arrangement is used in several places throughout my invention and whenever it is stated hereinafter that the rotation of the shaft of a teletorque receiver is used to energize a follow-up motor to drive another member a system substantially the same as that just described will be intended.

Referring still to Fig. 4, it will be seen that disc 190 is rigidly mounted upon horizontal shaft 208 upon the other end of which is rigidly affixed spur gear 210 which meshes with rack 212. This rack carries a bracket 214 by means of members 215. Splined shaft 216 is free to rotate within bracket 214. Upon the right end of this splined shaft is rigidly affixed spur gear 218 which meshes with the gear 84 which, it will be recalled, is rotated by constant speed motor 82. Drum 220 is mounted upon splined shaft 216 in a manner to be rotated thereby yet allowing this drum to slide along the splined shaft. An upraised cam portion 222 encircles drum 220 in exactly the same manner that upraised cam portion 92 shown in the upper part of Fig. 4 encircles drum 90. An insulating block 224 and a plurality of contact strips designated generally by 226 are provided as is a roller cam follower 228 and a plurality of wires 230 which connect to the contact strips as shown. Inasmuch as the construction and operation of the roller 228, strips 226 and wires 230 in response to a rotation of the drum 220 and cam 222 is an exact duplicate of the previously-described functioning of the corresponding elements shown in the upper part of Fig. 4, it is deemed unnecessary to point out in detail the functioning of these parts. It is sufficient to know that the wires 230 are contained in the cable 124a shown in Fig. 2 which connects to the fighter recorder 28.

Carried upon two of the vertical shafts of recorder 28, as is more fully described in the U. S. Patent 2,179,663, are two synchronous motors (only one shown) designated by 234. These motors are connected by means of gear trains 236 to the propelling wheels 148 of the fighter recorder.

Referring again to Fig. 4, it will be seen that the follow-up motor 202 by means of the gear train 206, disc 190, shaft 208, gear 210, rack 212 and bracket 214 positions the drum 220 and cam 222 along splined shaft 216 according to the angular position of the output shaft 182 of fighter ground speed teletorque receiver 180. Therefore, the proportion of time that fighter recorder 28 is propelled by its motors 234 depends upon the angular position of the shaft 182 of fighter ground speed receiver teletorque 180.

Inasmuch as the position of arm 164 shown in Fig. 2 depends upon the position of throttle 150 and arm 164 is connected by means of cable 172 to the spring biased input shaft of fighter ground speed transmitting teletorque 176 which is connected to teletorque receiver 180 shown in Fig. 4, it will be understood that a movement of throttle 150 affects the position of contact roller 188 which governs through the intermediate described means the position of drum 220 and cam 222 along splined shaft 216. The rate of the travel of fighter recorder 28 is therefore dependent upon the position of throttle 150 and, of course, the specific connections are such that the farther throttle 150 is positioned to the left in Fig. 2 the farther to the right along splined shaft 216 are placed drum 220 and cam 222. Therefore, an opening of throttle 150 causes recorder 28 to move a larger proportion of the time, thereby simulating a greater assumed ground speed of the fighter 12, while a closing of the throttle has a contrary effect.

Referring now to Fig. 2A it will be seen that bracket 238 is rigidly affixed to the bottom 170 of the trainer fuselage and shaft 240 is rigidly held by this bracket. This shaft connects to the walking beam 160a in order that the position of arm 164 will be the differential result of the position of throttle 150 and the attitude of fighter 12, i. e., whether the fuselage be climbing or diving. Shaft 240 is connected to arm 164 so that when the trainer fuselage dives arm 164 is moved in the same direction that it is moved when throttle 150 is open and when the trainer fuselage is in a climbing position arm 164 is moved in the opposite direction just as is the case when throttle 150 is closed.

Inasmuch as it has been shown that the position of member 164 through teletorque transmitter 176 and the mechanism shown in the lower part of Fig. 4 determines the rate of travel of fighter recorder 28 it is deemed unnecessary to show further that a diving of the trainer fuselage increases the rate of travel of recorder 28 and that a climbing of fuselage 12 results in the opposite effect.

From the foregoing, it will be understood that the direction of movement of fighter recorder 28 over the chart 24 is automatically responsive to changes in the direction of fighter 28 so that the recorder travels at all times in accordance with the heading of fighter 12. Furthermore, the rate of movement of recorder 28 is at all times automatically responsive to the assumed rate of travel or ground speed of the fighter 12, which rate depends upon the two factors of throttle setting and fighter attitude. It has been previously shown that the direction and rate of travel of the target recorder 26 over the chart 24 may be controlled manually by the instructor to simulate any desired heading and ground speed of the target.

Arm 164 is connected to an air speed indicator (not shown) in the fighter and to the air speed indicator 165 shown in Fig. 1 to indicate the assumed air speed of the fighter 12. These connections are as described in U. S. Patent 2,099,857.

Means for determining azimuth

It has been previously explained that the azimuth from a radar equipped plane to the target is shown upon the radar indicating means carried by the plane by the horizontal position of the image on the C scope. Azimuth has been defined as the angle between the fighter's longitudinal axis and the projection of the line of sight from the fighter to the target on the plane through the lateral and longitudinal axes of the fighter. Reference is made to Fig. 9 where the line L designates the direction of flight and the longitudinal axis of the radar equipped plane; S designates the projection of the line of sight from the fighter to the target T on the plane through the lateral and longitudinal axes of the fighter; and the angle A designates the azimuth.

As previously explained, it will be understood that azimuth depends upon the relative geographic positions of the target and fighter, that is, if the target moves in any direction other than along the line of sight azimuth is changed. Likewise, any change in the position of the fighter above the earth except along the line of sight changes azimuth. A second factor which affects azimuth is the direction of flight of the fighter with respect to the target. If the fighter changes its compass direction of flight, azimuth is changed.

Means will now be disclosed for automatically ascertaining the component of azimuth which is determined by the relative geographic positions of the fighter and target above the earth's surface.

Reference is made again to Fig. 3 which shows the fighter recorder 28 and the target recorder 26. Inasmuch as each of these recorders covers an area upon the chart 24 representative of many square miles of the earth's surface a specific point upon each of these recorders must be selected to represent the exact spot at which the fighter 12 and target are respectively located.

As shown in Fig. 3, the fighter recorder 28 is equipped with an inking wheel 242 rotatably mounted in the lower forked end of a vertical shaft 244. The fighter plane is assumed to be at the point where the bottom of inking wheel 242 rests upon the chart 24. This point is coincident with the axis of shaft 244. Rotatably mounted upon the upper end of shaft 244 is a block 246 which slides in the track 248 of the horizontal bar 250. Rigidly affixed to the right end of bar 250 as seen in Fig. 3 is vertical shaft 252 which extends up through and is rotatably supported by extension 254 of the central member 33 of the target recorder. Spur gear 256 is rigidly affixed to vertical shaft 252 and meshes with gear 258 which is fixed upon the input shaft 260 of target compass bearing teletorque transmitter 262. This teletorque transmitter is connected by means of the wires carried in cable 264 with the target compass bearing receiving teletorque 266 shown in Fig. 5. Target compass bearing receiver teletorque 266, as seen in Fig. 2, forms a part of the attitude take-off unit 267 shown to be mounted upon the rear of the octagon 15 of the fighter 12.

The target plane is assumed to be located at the point where the longitudinal axis of vertical shaft 252 intersects the chart 24. The bearing from the position of the fighter 12 to the position of the target may be ascertained, therefore, by determining the angle between north on the chart 24 and the line of sight from the target recorder to the fighter recorder. This concept is illustrated in Fig. 9 where the point F represents the position of the fighter recorder, T represents the position of the target recorder, the vertical lines run north and south, north being at the top of the chart, and the line S represents the line of sight from the fighter 12 to the target. The target compass bearing is given by the angle B.

Bearing in mind the preceding mechanical and theoretical discussion, referring to Fig. 3, if the target recorder 26 remains stationary and the fighter recorder 28 moves so that the inking wheel 242 travels across the chart 24 in any direction other than along the line of sight, block 246 will cause bar 250 to rotate about the axis of vertical shaft 252. A rotation of gear 256 therefore results and the input shaft 260 of target compass bearing teletorque transmitter 262 is rotated. A rotation of the output shaft 268 of target compass bearing receiver teletorque 266 therefore results. Teletorque 266 is shown in Fig. 5, to which reference is now made.

Rigidly affixed upon shaft 268 is a contact roller 270 which, as a result of its movement, energizes follow-up motor 272 in exactly the same way that follow-up motor 202 is energized. Motor 272 turns through an intermediate gear train 273 gear 276 which is rigidly affixed upon splined shaft 278. Upon the other end of this shaft is rigidly affixed bevel gear 279 which drives its companion 281 which is rigidly affixed to shaft 283. This shaft, it will be seen, drives bevel gear 277 which is the primary drive of differential designated generally as 280. A rotation of the primary drive results in a corresponding rotation of the output shaft 282 of this differential and consequently gear 284 which is rigidly affixed upon the other end of this shaft is rotated. Gear 286 meshes with gear 284 and is free to rotate upon shaft 288. The rotation of gear 286 causes a rotation of gear 290 which is affixed upon the input shaft 292 of the azimuth transmitting teletorque 294. This teletorque is connected by means of the wires contained in cable 296 with the azimuth receiving teletorque 298 shown in Fig. 2 to be a part of the potentiometer drive unit 300.

Potentiometer drive unit 300 comprises three potentiometers, one of which is controlled by azimuth receiving teletorque 298 through a follow-up system similar to that previously described. The potentiometer unit is positioned in accordance with the position of the output shaft of the receiver teletorque 298 to establish an electrical value in direct linear proportion to the assumed azimuth of the target from the fighter as determined by the output of azimuth receiving teletorque 298. The potentiometer then feeds this established electrical value by means of cable 300a into the Sanborn equipment designated 301 in Fig. 2. This equipment is oftentimes referred to in the art as the echo simulator, and being known to the prior art forms no part of my invention except when combined with the parts of my invention. The Sanborn equipment, in response to the electrical value fed thereinto by the azimuth potentiometer generates a signal in accordance with the potentiometer determined electrical value and feeds this signal by connection 300b into the intermediate frequency stage of the real radar equipment which is associated with the fighter 12 and designated in Fig. 2 by 303. The C scope and range meter are shown in Fig. 2 to be a part of the radar equipment. The illustrated radar equipment is of the type designated by United States Army Number SCR 520-B. This signal fed into the radar equipment by the echo simulator is the same signal that would be fed into the radar equipment carried by a plane in actual flight if the azimuth of a real target were the same as that represented by the position of azimuth receiving teletorque 298. The radar equipment therefore positions the image on the C scope horizontally, which direction gives the azimuthal position of the target, just as the image is positioned on the C scope when the azimuth of a real target is equal to that determined by the previously described apparatus of this invention.

When the radar equipment is of the SCR 520-B type, the Sanborn equipment or echo simulator is of the type referred to by the U. S. Army designation BC 934-T4. The combination of SCR 520-B radar equipment and of BC 934-T4 echo simulators is known to the prior art, but in the prior art devices the three potentiometers associated with the echo simulator to set up an electrical value in the simulator according to azimuth, elevation angle and range were manually set according to the three assumed factors of azimuth, elevation angle and range. My invention resides, therefore, in the disclosed means for introducing into the simulator the assumed factors of azimuth, elevation angle and range.

Also, in the known combination of SCR 520-B radar equipment and BC 934-T4 simulators, means are provided under the control of the radar operator for regulating certain parts of the equipment. When my invention is used with the just mentioned types of radar and echo simulators, the radar operator's equipment is not changed from the prior art, and the radar operator's functions are unchanged. (The radar operator should not be confused with the student pilot.) For example, the radar operator switches the apparatus to selectively use either of scales of the range meter 19, and the conventional signalling means informs the pilot in the conventional manner which scale should be read.

Because of the highly secret nature of the Sanborn echo simulator equipment and of the radar equipment, and in view of the fact that they do not form in and of themselves any part of my invention, it is deemed unwise and unnecessary to explain their detailed construction. A complete disclosure of these units may be obtained upon access to the U. S. Army equipment of the above-mentioned numbers.

Without further detailed description it will be understood that if the target recorder 26 or fighter recorder 28 changes its position relative to the other recorder in any direction except along the lines of sight, the input shaft 260 of the target compass bearing transmitting teletorque 262 likewise will be turned, and by means of the same intermediate described means the output shaft of azimuth receiving teletorque 298 will be moved. As explained, the image on the C scope will then be properly shifted to indicate the change in azimuth. Of course a movement of both the target and fighter recorders differentially affects the position of the input shaft 260 so that the image on the scope is positioned to indicate the differential change in azimuth.

It may be concluded therefore that means are provided by my invention whereby a relative movement of the fighter recorder 28 or target recorder 26 with respect to one another in any direction other than the line of sight produces a change in the azimuth indicated by the radar indicating means of this invention just as a corresponding movement of a real radar equipped plane or target relative to one another produces a change in the azimuth indicated by the radar indicating means carried by the plane.

It has also been previously stated that the second factor which determines the azimuth from the radar equipped plane to the target is the direction of flight of the plane with respect to the target. The theory of this statement may be realized by a reference to Fig. 9 in which it will be seen that azimuth angle A will change as the radar equipped plane F changes its direction of flight. Means for simulating this feature of radar navigation are partially shown in Fig. 2 where it will be seen that spur gear 302 is rigidly affixed to the cross piece 301 which is a part of the stationary base 10. Meshing with this gear is gear 304 which is rigidly affixed to the vertical shaft 303 having affixed upon its upper end bevel gear 306. Vertical shaft 303 is rotatably mounted within a bracket (not shown) which is affixed to crosspiece 307 of the rotatable octagon 15. Shaft 303 and gear 304 therefore rotate about gear 302 with a turning of fighter 12. This gear meshes with a driven bevel gear 308 which is rigidly affixed upon horizontal shaft 310 which runs fore and aft of the fighter. This shaft is held in place by bracket 311 which is affixed to the bottom 170 of the fighter fuselage 12. Shaft 310 extends through the octagon 15 of the trainer into the attitude take-off unit 267 which is mounted upon the shelf 269 affixed to octagon 15. Octagon 15 and shelf 269 rotate with fighter 12. Shaft 310, it will be seen in Fig. 5, has rigidly affixed upon its rear end gear 312 which meshes with a pair of split anti-backlash gears 314 which are affixed to the frame 316 of the differential 280. This attachment of gear 314 to the frame of differential 280 constitutes a secondary drive of the differential. Shaft 282 which is the output shaft of this differential is free to rotate within gear 314.

A rotation of fuselage 12 causes a rotation of shaft 310 by means of the gears 302 and 304 seen in Fig. 2 and the other gears just described. This secondary input of the azimuth differential 280 adds or subtracts from the quantity introduced into differential 280 as a result of the relative positions of the recorders 28 and 26 upon the chart 24. Shaft 282 therefore is positioned at all times according to the differential result of the target compass bearing as determined by the relative positions of the recorders modified by the heading of fighter 12. Consequently, the input shaft 292 of azimuth transmitting teletorque 294 and the output shaft of azimuth receiving teletorque 298 assumes a corresponding position. Azimuth as indicated upon the scope of the radar equipment in fighter 12 is therefore the differential result of the relative geographic positions of the fighter and target, as indicated by the positions of the recorders, and the heading of the fighter, just as azimuth indicated by radar equipment carried by a real plane in flight depends upon the two corresponding factors.

Pitching and banking of a radar equipped plane under certain conditions of flight also affect the azimuth of a target, as previously defined. My invention does not provide means for simulating this feature of actual radar navigation, but inasmuch as the fighter 12 is necessarily limited in the degree of pitch or bank which may be present, and in view of the fact that it is only under certain conditions of flight that pitch and bank affect azimuth, the failure of my invention to provide means for correcting azimuth according to pitching and banking of the fighter 12 does not deprive my invention of great utility.

*Means for determining target altitude angle and target slant range*

"Target altitude angle" is defined as the angle between the horizontal plane and the line of sight from the fighter to the target. This concept will be readily understood by a reference to Fig. 10 wherein F represents the position of the fighter; P represents the horizontal plane; T represents the target and A represents target altitude angle.

"Target slant range" has been defined as the distance along the line of sight from the fighter to the target and will be recognized as being represented in Fig. 10 by the line TSR.

"Target ground range" is the horizontal projection of the target slant range and is represented in Fig. 10 by the line GR.

"Altitude differential" is the difference in altitude between the fighter and target and is represented in Fig. 10 by the line AD.

Referring to Fig. 10 it will be realized that the target altitude angle A and the target slant range TSR depend only upon the magnitude of the factors of ground range GR and altitude differential AD. Means for determining the magnitudes of these two primary quantities and for causing the same to affect the radar indicating means carried by the fighter 12 will now be disclosed. As will be disclosed a mechanical triangulating mechanism is used to determine the factors of target slant range and altitude angle, one side of the triangle being representative of ground range and the other of altitude difference. Ground range will first be considered.

Referring again to Fig. 3 which shows the fighter recorder 28 and target recorder 26 it will be seen that a string 318 enters block 246 at a point coincident with the longitudinal axis of vertical shaft 244. This string is suitably tied within block 246 and runs along the slot 248 in bar 250 and turns at right angles to run inside vertical shaft 252. It then winds around and is fastened to pulley 320 which is rigidly affixed upon the input shaft 322 of ground range transmitter teletorque 324 which is carried by the target recorder. String 319 is fastened to and winds around small pulley 321 which is affixed to pulley 320, and the other end of this string is connected to tension spring 326 which in turn is fastened to plate 254. It will be realized that as the inking wheel 242 of the fighter recorder 28 moves over the chart 24 in a direction to increase the distance between the point upon the chart where the inking wheel rests and the intersection of the axis of vertical shaft 252 with the chart, block 246 will increase its distance from the vertical shaft 252 and, therefore, string 318 is pulled by block 246 so that pulley 320 rotates in a counterclockwise direction. The input shaft 322 of the ground range transmitter teletorque 324 is therefore rotated and inasmuch as this teletorque is connected by means of cable 328 to ground range receiver teletorque 330 which is a part of the elevation angle unit 332, as seen in Fig. 2, the output shaft 334 of the ground range receiving teletorque 330, as seen in Fig. 7, will be rotated in the desired direction.

On the other hand, if the distance between the point where inking wheel 242 rests upon the chart and the intersection of the longitudinal axis of shaft 252 and the chart decreases spring 326 turns pulley 320 in a clockwise direction and the output shaft 334 of the ground range receiver teletorque 330 will rotate in the opposite direction.

Referring to Fig. 7, fixedly mounted upon output shaft 334 is disc 336 which carries bracket 338 and contact roller 340. This roller acts upon disc 342 which is identical with the disc 190 and disc 342 controls the action of follow-up motor 344 in the same manner that the action of follow-up motor 202 is controlled. The energization of follow-up motor 344 as a result of the turning of the output shaft 334 of ground range receiver teletorque 330 causes a rotation of the output shaft 346 of follow-up motor 344. Worm 348 is integral with shaft 346 and turns the worm gear 350 which is fixed upon shaft 352. The rotation of this shaft causes a rotation of the spur gear 354 which is fixed thereto and at the same time rotates control disc 342 until the roller 340 is positioned with respect to the split segments carried by disc 342 to stop follow-up motor 344. The rotation of gear 344 at the same time moves rack 356 parallel to shaft 358.

It will be seen that rack 356 is affixed to slide 360 by means of screws 362 and that the integral extension 364 of slide 360 is bored for the reception of bearing 366 which is rotatably mounted within extension 364. Bearing 366 is adapted to rotate with and slide along splined shaft 365.

A slot 368 is present in extension 364 and in this slot is a rack 370 in which is pivotally mounted vertical stub shaft 372. The upper end of shaft 372 is pivotally mounted in block 374 which is adapted to slide in the groove 376 of limb 378, upon the other end of which is affixed by means of screws 380 the gear 382. Gear 382 is suitably mounted so that its axis of rotation is coincident at all times with vertical line 384.

From the preceding discussion it will be realized that rack 356, slide 360 and extension 364 can slide along splined shaft 365 so that the vertical axis designated by line 385 may be made coincident with the vertical axis 384. (The vertical axis 384 preferably intersects the longitudinal axis of splined shaft 365.)

A string 386 enters block 374 at a point coincident with the vertical axis 385 and is suitably tied in block 374. This string runs along slot 376 and at the point where it reaches the vertical axis 384 it turns upwardly toward the pulley 388. The string winds around and is fastened to this pulley which is fixedly mounted upon the input shaft 390 of slant range transmitting teletorque 392. String 389 winds around and has one end fastened to small pulley 391 which is affixed to pulley 388. The other end of this string is fastened to spring 394 which in turn is anchored to any suitable part 397 of the housing of the instrument.

The distance from the point where the axis 384 intersects the longitudinal axis of splined shaft 365, which point is designated in Fig. 7 as I, to the point where a plane through the vertical axis 385 of shaft 372 and perpendicular to splined shaft 365 intersects the longitudinal axis of the splined shaft, which point is designated in Fig. 7 by the letter J, is assumed to be representative of the ground range as previously defined. When the point J is coincident point I, ground range is assumed to be zero and as point J moves to the left in Fig. 7 the ground range is assumed to increase.

The distance from axis 385 along string 386 to axis 384 is representative of and proportional to target slant range. As ground range increases, target slant range also increases in this mechanical triangle.

Bearing in mind the preceding structural and theoretical discussion, it will be understood that as the inking wheel 242 of the fighter recorder 28 increases its distance from the point upon the chart where the longitudinal axis of shaft 252 intersects the chart, the pulley 320 and input shaft 322 of ground range transmitting teletorque 324, shown in Fig. 3, are rotated and consequently the output shaft 334 of ground range receiver teletorque 330 shown in Fig. 7 is rotated through the same angle and in the desired direction. As previously described the follow-up motor 344 is energized and its output shaft 346 turns in such a direction as to cause spur gear 354 to rotate counterclockwise as seen in Fig. 7. The point J therefore increases its distance from the point I and at the same time the distance between axes 384 and 385 is increased. String 386 is pulled to the left and downward resulting in a counterclockwise rotation of the pulley 388 and input shaft 390 of slant range transmitting teletorque 392. This teletorque, by means of the wires contained in cable 393, causes the output shaft of the slant range receiving teletorque 396, shown in Fig. 2, to move through an equal angle and in the desired direction. This teletorque governs a potentiometer follow-up unit in exactly the same manner described in the consideration of azimuth receiving teletorque 398 and its potentiometer unit in unit 300. The potentiometer unit governed by slant range receiving teletorque 396 establishes an electrical value according to the assumed slant range and this value is fed into the Sanborn equipment which then functions in cooperation with the radar apparatus to cause the range meter 19 to indicate the assumed range represented by the position of the output shaft of the range receiver teletorque 936. However, to accomplish this result the radar operator must properly perform his tasks just as in the operation of the SCR 520-B radar equipment in actual flight.

It is deemed unnecessary to explain in detail that as the assumed ground range decreases, ground range being represented by the distance between the point where inking wheel 242 rests on chart 24 and the point where the longitudinal axis of vertical shaft 252 intersects chart 24, the described elements operate to decrease the distance between axes 384 and 385 resulting in a lower reading of the range meter 19. As the slant range changes, the size and intensity of the image on the screen 17 changes.

In addition to the factor of ground range which has been shown to affect target slant range, the factor of altitude differential also affects target slant range. This can be seen by reference to Fig. 10 where it is evident that, ground range remaining constant, an increase in altitude difference results in an increase in target slant range.

Altitude differential is in part introduced by the fighter altitude transmitter 459 in Fig. 1, the detailed mechanism of which is shown in Fig. 6 which comprises a large metallic collapsible and expansible bellows 398 which is connected to the equalizer altitude tank 398a in Fig. 1 by means of connection 400. The construction and functioning of the altitude tank forms no part of my invention except as combined with the novel features being described. In the previously-mentioned U. S. Patent 2,099,857, the altitude tank is designated 177 and it is sufficient for the purposes of this application to state that the pressure within the altitude tank is varied according to the assumed altitude of the trainer, the higher the assumed altitude the lower the pressure within the tank. The pressure within the tank is responsive to two factors, namely, throttle setting and attitude of the fuselage. When the throttle is open the pressure within the tank is made to decrease because the opening of the throttle in a plane in actual flight causes an increase in the altitude thereof. Similarly, when the fuselage is placed in a climbing position, the pressure within the tank is caused to decrease. A closing of the throttle and the assumption of a diving attitude by the fuselage results in an increase in pressure within the tank. The pressure within the altitude tank is controlled by link 400a, seen in Fig. 2A, through the conventional climb-dive valve assembly in the trainer fuselage 12.

Affixed to the upper end of bellows 398 is member 402 which has a slot 404 and pin 406 arranged to hold one end of reciprocating arm 408 which travels in a plurality of rollers 410 suitably attached to plate 412. To the other end of arm 408 is affixed string 414 which travels in pulley 416 suitably held by shaft 418 which is carried by plate 412. The other end of this string is affixed to one end of tension spring 420, the other end of which is suitably attached to any fixed part 422 of the unit.

A plate 424 is pivoted at the point 426 to a suitable part of the unit, and formed integrally with plate 424 is gear segment 428. A tension spring 430 is suitably attached to a corner of gear segment 424 as shown, the other end of this spring being attached to a fixed part 432 of the unit. A shaft 434 is affixed to slide 408 and has mounted thereupon toward its outer end roller 436, and a spring 438 has one of its ends attached to the extreme outer end of shaft 434 while its other end is suitably attached to a bolt 440 carried by plate 424. A plate 442 having a slot 444 is suitably attached to the inside of plate 424 by means of a pair of bolt, nut and slot arrangements 446.

Meshing with the gear segment 428 is pinion 448 formed integrally with shaft 450 held by bracket 452 attached to plate 412. Fixedly mounted upon this shaft 450 is a large spur gear 454. The input shaft 456 of the fighter altitude transmitting teletorque 458 is connected to shaft 450 for rotation therewith and teletorque transmitter 458 is connected by means of the wires carried in cable 460 with fighter altitude receiver teletorque 462 shown in Fig. 7.

Upon the output shaft 464 of fighter altitude receiver teletorque 462 is carried a disc 466 which has attached thereto an arm 468 carrying a roller 470 in the same manner as the teletorque receiver 180 and associated parts shown in Fig. 4. A rotation of the output shaft 464 of fighter altitude teletorque receiver moves roller 470 with respect to disc 472 which has a pair of split segments such as previously described, thereby energizing reversible follow-up motor 474, causing a rotation of its output shaft 476. A rotation of this shaft causes a rotation of worm 478 formed integrally therewith and worm gear 480 is therefore driven, causing a rotation of the splined shaft 365 upon which it is rigidly mounted. A rotation of this splined shaft will cause a movement of rack 370, the lower surface of which comprises a plurality of teeth for coaction with splined shaft 365. A rotation of splined shaft 365 will therefore move rack 370 in slot 368 of extension 364, and vertical stub shaft 372 and axis 385 will be moved toward or away from the point J which it will be recalled is coincident with the longitudinal axis of shaft 365. The distance from point J to the axis 385 is representative of and proportional to the assumed difference in fighter and target altitudes. When axis 365 and point J are coincident the assumed altitude difference is zero.

Referring now to Fig. 6, a reduction in the pressure within the altitude tank in the trainer which, as previously explained results from an increase in the assumed altitude of the fighter 12, causes a collapsing of bellows 396 and slide 408 will move downwards in Fig. 6. A movement in that direction will result in a similar movement of shaft 434 and roller 436. This roller coacting with arcuate slot 444 causes a counterclockwise pivoting of plate 424 resulting in a clockwise turning of pinion 448, gear 454 and of the input shaft 456 of fighter altitude transmitting teletorque 458. The output shaft 464 of fighter altitude receiving teletorque 462 shown in Fig. 7 will therefore move in the desired direction, resulting in an energization of follow-up motor 474 which will turn in a direction to cause splined shaft 365 to move clockwise as seen from its left end in Fig. 7. Rack 370 will therefore move to the right along slot 368 carrying with it stub shaft 372, axis 385, block 374 and the unpivoted end of arm 378. Gear 382 will therefore rotate about vertical shaft 384 rotating the gear 482 which meshes therewith. This gear is rigidly affixed upon the input shaft 484 of elevation angle transmitting teletorque 486 which is connected by means of the wires in cable 488 with the elevation angle receiving teletorque 490 associated with the potentiometer unit 300, seen in Fig. 2. Elevation angle receiving teletorque 490 functions with respect to its potentiometer unit as previously described in connection with the azimuth receiving teletorque 298, also shown in Fig. 2 except, of course, the potentiometer in unit 300 controlled by elevation angle receiver teletorque 490 is connected to the Sanborn radar equipment to cause the position of the image upon the radar indicating means in the trainer to vary vertically. A vertical change, as previously described, represents a change in the elevation angle from the fighter to the target.

Again, it is deemed unnecessary to explain in detail that an increase in the pressure within the altitude tank results in an expansion of bellows 398 and as a result of the functioning of the previously-described elements in the reverse directions an indication is produced upon the scope representative of a lesser elevation angle from the fighter to the target.

The preceding explanation discloses the manner in which a change in the assumed altitude of the fighter affects the radar indication.

The factor of target elevation is introduced manually by the instructor by the means disclosed in Fig. 7. Shown therein is a crank 492 which is connected through a gear train designated generally 494 to a flexible cable 496. Upon the other end of this flexible cable is fixed pinion 498 which, by means of a pair of gears designated 500, drives gear 502 which is affixed to the housing of fighter altitude receiver teletorque 462. A rotation of the housing of this teletorque results in a rotation of the output shaft 464 of the receiver because in systems of this kind the output shaft of the receiver teletorque at all times bears the same relation to its housing as the input shaft of the transmitting teletorque bears to its housing. A rotation of the housing of the receiver therefore must result in a rotation of the output shaft of the receiver because the housing and input shaft of the transmitter are held stationary. The rotation of the output shaft 464 and roller 470 acting with disc 472 will energize follow-up motor 474 to rotate the splined shaft 365. Consequently, rack 370 will be moved in slot 386 carrying with it vertical shaft 372 and axis 385.

Dial 504 is geared to crank 492 by means of gears designated generally 506 and by reference to this dial and a fixed pointer (not shown) the instructor may ascertain the assumed altitude of the target which he has introduced into the mechanism.

As has been described, the distance between the point I of Fig. 7 and the point J is at all times proportional to the ground range. Point J is coincident with the longitudinal axis of shaft 365 and therefore does not move with a movement of rack 370 in slot 368. The distance from J to the longitudinal axis 385 of stub shaft 372 is at all times proportional to the assumed altitude difference and this difference is the differential result of the altitude of the fighter as introduced automatically and the altitude of the target as introduced manually. The mechanism is connected so that an increase in the altitude moves axis 385 away from point J while an increase in the fighter altitude moves axis 385 toward point J. It should be noticed that axis 385 may be moved to either side of point J, so the mechanism may indicate a positive or negative target elevation angle. Inasmuch as the distance I—J represents ground range, and the distance J-axis 385 represents altitude difference, it is clear that the distance from axis 385 to axis 384 represents target slant range. Also, the angle formed by the arm 378 and the splined shaft 365 must be equal to the altitude angle.

Such being the case, it is clear that as ground range is increased the distance from axis 385 to axis 384 likewise increases, so slant range increases. Also, as the altitude difference increases the difference from the axis 385 to the axis 384 increases, and slant range increases accordingly. (If the altitude difference is zero, the target slant range is equal to the ground range.)

As the distance from the axis 385 to axis 384 increases, the input shaft 390 of the slant range transmitting teletorque 392 is turned and by means of cable 393 the output shaft of slant range receiving teletorque 396 shown in Fig. 2 is rotated to produce through the Sanborn and radar equipment an increased indication upon the range meter 19. An opposite indication results when the input factors are such as to cause a decreased target slant range.

It has been stated that the angle between the longitudinal axis of splined shaft 365 and the arm 378 (or line from axis 385 to axis 384) is equal to the altitude angle. As this angle increases or decreases as a result of changes in the magnitudes of ground range or altitude difference, gear 382 is rotated proportionately causing a rotation of gear 482 and the input shaft 484 of elevation angle transmitting teletorque 486. This teletorque is connected by cable 488 to elevation angle receiving teletorque 490 (seen in Fig. 2) which actuates a potentiometer drive like that previously described. The potentiometer drive, through the same intermediate means, changes the vertical position of the image on the C scope, to indicate that the target elevation angle has changed. This primary drive of elevation angle teletorque 486 therefore results in the vertical positioning of the image on the C scope in accordance with the altitude angle as determined by the mechanical triangle of Fig. 7. Means for combining this altitude angle with the pitching and banking of the trainer fuselage to produce elevation angle will be later described.

Referring now to Fig. 6, it has been mentioned that plate 424 carries a plate 442 in which is formed an arcuate slot 444 and that as slide 408 reciprocates roller 436 moving in slot 444 rotates input plate 424 which causes a rotation of the input shaft 456 of the fighter altitude transmitter teletorque 458. This slot 444 and non-circular gear segment 428 are provided to change the non-linear response of the bellows 398 to a change in the assumed altitude of the trainer to a linear rotation of the input shaft 456 of the fighter altitude transmitting teletorque 458. When the fighter 12 is at a low assumed altitude a change of, for example, 1000 ft. in its assumed altitude, results in a greater change in the pressure within the altitude tank (not shown) in the trainer fuselage, and consequently in a greater expansion or collapsing of bellows 398 than occurs when the trainer is assumed to be flying at a higher altitude and a change of 1000 feet in altitude occurs. In the use of real radar equipment in a plane, a change of 1000 feet in the altitude of the plane carrying the radar equipment, other factors being constant, will produce a given change in the elevation angle as seen on the screen. It is immaterial whether the plane is flying at 10,000 feet or 30,000 feet when the change occurs. In order that the mechanism of my invention function properly it is clear that for a change of a given amount in the altitude of the trainer, the input shaft 456 of the fighter altitude teletorque transmitter must rotate through the same angle regardless of whether the fighter is assumed to be flying at a high or low altitude, so that the image on the screen will properly move to reflect the change in elevation angle. Therefore, the slot 444 and non-circular gear segment 428 are used.

Also shown in Fig. 6 is a telegon transmitter 508 having a central shaft 510 which is coupled by a pair of magnets 512 to a shaft 514 which has a pinion 516 that meshes with gear 454. This telegon transmitter is known as the altitude telegon transmitter and is connected by means of the wires contained in cable 514 to a telegon receiver which drives the altimeter (not shown) in the fighter 12 as well as the altimeter 518 positioned near the table 22 as seen in Fig. 1. The telegon system of instrument actuation is well known in the field of aviation training. Inasmuch as the functioning of the telegon instruments is substantially the same in all respects as the functoning of a teletorque system, explained hereinbefore, a detailed explanation of this system is not deemed necessary.

Vertical speed indicator 519 shown in Fig. 1 functions substantially as described in United States Patent 2,099,857.

*Means for correcting altitude angle according ot pitching and banking to produce elevation angle*

"Target altitude angle" has been defined as the angle between the horizontal plane through the fighter and the line of sight from the fighter to the target.

"Target elevation angle" has been defined as the angle between the plane through the lateral and longitudinal axes of the fighter and the line of sight from the fighter to the target.

A comparison of these two definitions shows that when the plane through the longitudinal and lateral axes of the fighter is horizontal, target altitude angle equals target elevation angle. However, when the plane through the lateral and longitudinal axes of the fighter departs from the horizontal, target elevation angle may not equal target altitude angle. The magnitude of the difference between target elevation angle and target altitude angle caused by a departure from the horizontal of the plane through the lateral and longitudinal axes of the fighter depends upon the azimuth of the target, the altitude angle and also upon whether the departure of the lateral and longitudinal axes of the fighter from the horizontal plane is caused by a banking or a pitching of the fighter.

Specifically, let us assume that the altitude of the fighter and target are the same and that the fighter is flying directly along the line of sight from the fighter to the target. The altitude angle is equal to zero. If the fighter assumes a diving position, it is clear that the target elevation angle has become a positive quantity because there then is a positive angle between the plane through the lateral and longitudinal axes of the fighter and the line of sight from the fighter to the target. On the other hand, if under the same assumed conditions the fighter assumes a climbing attitude, a negative target elevation angle is produced. It is clear that under these assumed conditions the magnitude of the target elevation angle is equal to the number of degrees of movement of the fighter about its transverse axis.

If the assumed conditions are changed only in that the altitude of the target is assumed to be different from that of the fighter, the same results occur when the fighter dives or climbs.

However, regardless of whether the altitude of the target and fighter are equal if the fighter is flying directly along the line of sight to the target, a banking of the fighter through a given angle does not cause target elevation angle to differ from target altitude angle. However, if the altitude of the target is equal or not equal to the altitude of the fighter, and the fighter is flying along a vertical plane through the target and fighter, but not flying along the line of sight, a banking of the fighter does cause the elevation angle to differ from the altitude angle, but for a given number of degrees of bank the change is not as great as when the fighter is pitched about its transverse axis through the same number of degrees.

All of the preceding conditions are also true when the fighter is flying directly away from the target, that is, the azimuth of the target is 180°.

However, assuming that the elevation of the target and of the fighter to be equal and the azimuth of the target is 90°, left or right, when this situation prevails a banking of the fighter causes the target elevation angle to differ from the target altitude angle by an amount equal to the number of degrees that the fighter is banked about its longitudinal axis. However, under these conditions a climbing or diving of the fighter through a given angle will not cause target elevation angle to differ from target altitude angle. If the azimuth is 90° and the target and fighter elevations are not equal, a banking of the fighter changes elevation angle by an amount equal to the degree of bank. A diving or climbing of the fighter, however, changes the elevation angle but not by as much as the angle of pitch bank of the fighter.

It is deemed unnecessary to explain in detail that when the azimuth of the target is intermediate any of the previously discussed values, the amount of the difference between altitude angle and elevation angle as a result of the pitching and banking of the fighter varies according to the previously laid down rules. As azimuth approaches zero or 180°, the effect of pitch upon target elevation angle increases while the effect of bank decreases; as azimuth approaches 90°, left or right, the effect of bank upon target elevation angle increases while the effect of pitch decreases.

It should perhaps be noted that target elevation angle can actually change, by definition from 90 degrees negative to 90 degrees positive, and that azimuth can similarly change from zero degrees to 180 degrees left or right. However, the type of radar equipment mentioned above produces an image on the screen only when the azimuth and elevation angles are within the predetermined limits shown in Fig. 8. But the invention of this application, as stated before, is not limited to use with any particular type of radar equipment or radar indicating means.

Means will now be disclosed for changing altitude angle according to azimuth and the pitching and banking of the fuselage to produce target elevation angle.

Referring to Fig. 7, it will be recalled that the angular position of arm 378 about the vertical axis 384 is equal at all times to the altitude angle as a result of the functioning of the mechanical triangle disclosed in Fig. 7. This angular movement in turn is imparted to the input shaft 484 of the elevation angle teletorque transmitter 486. The means for modifying the effect of the angular input of shaft 484 according to the climbing and diving of the fighter 12 are primarily shown in Figs. 1, 2 and 5. Referring to Fig. 2, there is disclosed a bracket 520 affixed to the under side of the bottom 170 of the fighter fuselage 12. A vertical link 522 has its upper end pivotally attached to this bracket and its lower end to the front end of bell crank 524. This bell crank is pivotally attached to shaft 526 upon which is pivotally mounted lever 528, the other end of shaft 526 being pivotally carried by fixed bracket 530. To the lower end of bell crank 524 is pivotally attached link 532 which extends along the longitudinal axis of the fighter 12 through octagon 15 and attaches to the outer end of crank 534.

Bracket 520 is attached to the bottom 170 of fighter 12 at a point to one side of universal joint 13 and along the transverse axis of the fuselage. Therefore, whenever the fuselage is banked, for example, to the left, bracket 520 goes down, pushing down the end of bell crank 524 to which it is attached. This causes the other end of this bell crank to move toward the rear, thereby moving link 532 in the same direction.

On the other hand, a banking of the trainer to the right will result in a movement of link 532 toward the head of fighter 12.

Still referring to Fig. 2, it will be seen that another bracket 536 is attached to the bottom 170 of fuselage 12, this bracket being attached at a point ahead of universal joint 13 and along the longitudinal axis of fighter 12. Attached to this bracket is a link 538 the lower end of which is pivotally attached to arm 540 which is rigidly mounted upon shaft 542 which is held by bracket 544. Rigidly affixed upon the other end of shaft 542 is arm 545, to the upper end of which is pivotally connected link 546 The other end of this link is pivotally connected to the upper end of lever 528 which is pivotally mounted upon shaft 526 and to the lower end of lever 528 is pivotally connected link 548 This link likewise extends longitudinally of fighter 12, passes through octagon 15 and enters the attitude correction unit 267 at the rear of fighter 12.

When the fighter 12 is placed in a diving position link 538 is forced downwardly as is the foremost end of arm 540. Shaft 542 therefore rotates in a counterclockwise direction as seen from the left in Fig. 2 and the upper end of arm 545 moves toward the head of the fighter. Link 546 therefore moves in the same direction as does the upper end of arm 528. The lower end of arm 528 and link 548 therefore move toward the rear of fighter 12.

On the other hand, a climbing of fighter 12 will cause link 548 to move toward the head of fighter 12.

Referring now to Fig. 5 which shows the detailed construction of the attitude take-off unit designated in Figs. 1 and 2 by 267, it will be seen that link 532 which moves to the left in Fig. 5 in response to a banking of fighter 12 to the left has its rear end pivotally connected to crank 534 which is suitably pivoted about the point 552. Rigidly held by the other end of this crank is vertical pin 554, the lower end of which rides in the groove of pulley 556 which is rigidly attached to bracket 558. Pulley 556 and bracket 558 are free to slide along shaft 560 which rotates within members 556 and 558. This shaft has its left end suitably rotatably mounted in the housing of the unit. Pivotally attached within the end of bracket 558 is a curved link 562 which has its other end pivotally connected to yoke 564 which has its ends affixed to inner gimbal 566 as shown. Link 562 is curved to provide clearance for the movements of gimbal 566, as will be later seen. Gimbal 566 is rigidly affixed to pivots 568 which have their other ends rotatably mounted within a larger outside gimbal 570. Gimbal 570 in turn is rigidly attached at one point to shaft 560 and is rigidly attached directly across therefrom to shaft 572 which has its other end suitably rotatably mounted in a fixed member (not shown).

The previously introduced shaft 288 has its rear end serrated to drive pinion 574 which is rigidly affixed to the input shaft 576 of elevation angle correcting teletorque 578. Torsion spring 580 is suitably mounted upon the rear of teletorque 578 to bias pinion 574 in a counterclockwise direction as seen in Fig. 5. Teletorque transmitter 578 is connected by means of the wires contained in cable 582 to the elevation angle correction receiving teletorque 584 shown in Fig. 7.

It has been stated that gear 286 is rotatably mounted upon shaft 288 and it will be seen that affixed to gear 286 by means of screws 586 is bracket 588. Pivotally mounted within the recess 590 in the fore end of bracket 588 is shaft 592 which has mounted upon one end a roller 594 which is adapted to roll along the track 596 formed in the interior of inner gimbal 566. The other end of shaft 592 is in the form of a yoke 598 which surrounds a turned down part of shaft 288 and presses against head 600 formed integrally with shaft 288. Spring 580 tends to move shaft 288 to the left as seen in Fig. 5 and, therefore, roller 594 at all times engages track 596.

Link 548 which, it will be recalled, moves to the left in Fig. 5 whenever the fighter 12 is dived, has its rear end pivotally attached to arm 602 which is rigidly mounted upon shaft 560.

It will be recalled that shaft 310 rotates in response to a turning of fighter 12 about its vertical axis and that this shaft, by means of gear 312, rotates gear 314 which is affixed to the housing 316 of differential 280. The rotation of gear 314 as a result of the rotation of shaft 310 therefore causes a rotation of shaft 282 which is the output shaft of differential 280. A rotation of gear 284 rotates gear 286. This results in a movement of bracket 588 around shaft 288 and, therefore, roller 594 moves around track 596 formed on the inside of gimbal 566. Inasmuch as the output of azimuth differential 280 is responsive to azimuth, as defined, which output is the combination of target compass bearing and fighter heading, it is clear that roller 594 is at all times positioned around track 596 in accordance with the factor of azimuth. For a change of fighter heading or target compass heading of a given number of degrees roller 594 moves around track 596 through the same number of degrees and in the correct direction.

A diving or climbing of fighter 12, therefore, by means of link 548, arm 602 and shaft 560 causes a pivoting of outside gimbal 570 about points coincident with the longitudinal axis of shaft 560. A banking of the trainer fuselage causes, by means of link 532, bell crank 534, pulley 556 and bracket 558, link 562 and yoke 564, a pivoting of inside gimbal 566 about points coincident with the longitudinal axes of pins 568.

Assuming that as a result of the turning of fighter 12, roller 594 is positioned as shown in Fig. 5, which position places the axis of rotation of roller 594 coincident with the axis of shaft 560, if the trainer banks to the left link 532 will move to the rear as will the end of bell crank 534 to which it is attached. By means of the intermediate connecting elements link 562 will move to the left as seen in Fig. 5 and inside gimbal 566 will be rotated counterclockwise as seen from above. This gimbal will therefore tend to move away from roller 594 but the action of spring 580 moving link 288 to the rear and causing roller 594 to move toward the front will maintain contact between the roller and the track 596. The movement to the left in Fig. 5 of shaft 288 will therefore rotate the input shaft 576 of elevation angle correcting teletorque 578 and, therefore, the output shaft 604 of elevation angle correction receiving teletorque 584 seen in Fig. 7 will move in the desired direction through the same angle. Rigidly affixed upon the output shaft 604 of the receiving teletorque is gear 606 which meshes with gear 608 which carries an arm 610 and contact roller 612 which coacts with control disc 614 which is similar to the previously-described disc 190. The movement of roller 612 across the disc 614 energizes follow-up motor 616 in the previously-described manner and the output shaft 618 of the motor is rotated. Bevel gears 620 and 622 are therefore rotated as is gear 624 which meshes with the gear 626 integral with disc 614. The rotation of this disc in turn rotates gear 628 which is rigidly affixed to the housing of elevation angle transmitting teletorque 486. The rotation of the housing of the transmitting teletorque 486 will result in a rotation through an equal angle of the output shaft of the receiving teletorque 490 shown in Fig. 2, and therefore, the vertical position of the image on the C scope will be appropriately changed in accordance with the magnitude of the rotation of the teletorque shaft.

With the mechanism positioned as seen in Fig. 5, assuming that the trainer banks in the opposite direction, that is, to the right, it is clear that link 562 will move to the right and that inner gimbal 566 will pivot clockwise as seen from above. Roller 594 will therefore be pushed to the rear and shaft 288 will move ahead against the action of spring 580. Pinion 574 will therefore rotate clockwise and the input shaft 576 of elevation angle correction transmitting teletorque 578 will therefore move in the same direction. The output shaft 604 of elevation angle correction receiving teletorque 584, shown in Fig. 7 to which reference is now made, will therefore move in the correct direction, follow-up motor 616 will be energized to turn in the opposite direction and the housing of elevation angle transmitting teletorque will be rotated in the opposite direction through the correct angle. Also, the output shaft of elevation angle receiving teletorque 490 shown in Fig. 2 will be moved in the opposite direction and the image on the scope will again be appropriately moved, this time in the opposite direction from which it was moved when the trainer was banked to the left.

Assuming that roller 594 were in any position other than that shown in Fig. 5 except 180° from the position shown it is clear that the rotation of inner gimbal 566 in response to a banking of fighter 12 would not move the roller as much and therefore the previously described elements which move in response to the action of the roller would also respond to a lesser extent. As roller 594 moves toward the uppermost or lowermost position along track 596 a rotation of the inner gimbal 566 produces a lesser effect in response to a banking of fighter 12 until when the roller is at the uppermost or lowermost position a banking of the fighter 12 would not move the roller at all. Consequently as the roller moves as just described the effect of bank decreases as the roller approaches the uppermost or lowermost positions in track 596.

Bearing in mind the theoretical description which has been given, roller 594 must occupy the position shown in Fig. 5 when the azimuth of the target is 90° left or right because when target azimuth is 90° left or right, bank affects altitude angle by a maximum amount to produce target elevation angle. Also, when azimuth is zero or 180° roller 594 must be at the uppermost or lowermost position along track 596 because at those azimuths bank alters altitude angle by a minimum amount. Actually, roller 594 is positioned as shown in Fig. 5 when azimuth is 90° right. When the fighter is banked to the left, the specific arrangement is such that the image on the C scope 17 moves downwardly, because under these conditions elevation angle decreases when a plane is banked to the left. When azimuth is 90° left, the roller 594 is positioned 180° from the position shown in Fig. 5, and then a banking of fighter 12 to the left causes the image on scope 17 to move up. The effect of right bank upon fighter 12 produces opposite movements of the image on the C scope, azimuth remaining the same. As azimuth changes from 90° left or right toward 0 or 180° the effect of banking upon elevation angle decreases. This generally simulates the effect of banking upon target elevation angle in real flight.

Assuming that the mechanism occupies the position shown in Fig. 5, a diving of the trainer will cause link 548 to move to the rear and the bottom of arm 602 moves in the same direction. Shaft 560 rotates in a clockwise direction as seen from the right in Fig. 5 and outside gimbal 570 as well as inside gimbal 566 rotate clockwise as seen from the right in Fig. 5 about the axis of shaft 560. Inasmuch as the axis of rotation of roller 594 is coincident with the axis of rotation it is clear that shaft 288 will not be moved and, therefore, no correction will be applied to the altitude mechanism shown in Fig. 7. Therefore, the mechanism shown in Fig. 5 applies no correction to the altitude angle as a result of a diving of fighter 12 when the apparatus is positioned as shown in Fig. 5. This conforms generally to the theoretical discussion previously given wherein it was pointed out that when azimuth is equal to 90° left or right, pitch has a minimum effect upon elevation angle.

A climbing of fighter 12, on the other hand, will produce the same result. Also, if roller 594 were 180° from its illustrated position the same result would again be realized. However, as roller 594 moves toward the uppermost or lowermost positions along track 596 a climbing or diving of fighter 12 produces a greater movement of roller 594, and consequently a larger correction to the elevation angle. When the roller is at the uppermost or lowermost position, the maximum correction is applied in accordance with the rule that climbing and diving produces a maximum change in elevation angle when azimuth is equal to 0 or 180°.

From the foregoing discussion it will be realized that the double gimbal ring arrangement in Fig. 5 provides means for correcting target altitude angle in response to a banking, climbing or diving of the fighter 12 to produce target elevation angle, and that the magnitude of the correction depends upon azimuth and whether the fighter is banked or climbed in simulation of the general effects of climbing, diving and banking under various circumstances of azimuth of a real radar equipped plane in actual flight. The image upon the C scope is therefore moved in simulation of the indications of radar means carried by a plane in actual flight in response to banking, climbing and diving of the plane under different conditions of azimuth.

Seen in Fig. 1 are an azimuth indicator 523, a target elevation angle indicator 525 and a range meter 527 suitably housed in box 527a carried by supports 527b. These indicators may be properly connected directly to the output shafts of the teletorques which drive the potentiometers in unit 300. They comprise merely a hand and dial and are provided to indicate to the instructor the assumed azimuth, elevation angle and range as determined by the previously-described invention.

*Summary*

In the foregoing detailed description means have been disclosed for causing radar indicating equipment in a grounded aviation trainer to indicate the azimuth, target elevation angle and slant range from the assumed position of a fighter represented by the grounded aviation trainer with respect to an assumed target. Real radar propagating means are not necessary and, as previously explained, only a part of the radar equipment carried by planes is used with my invention.

The means of my invention include a pair of recorders whose positions upon a chart represent the respective positions of a fighter and target. The distance between these two recorders is assumed to be proportional to the ground range and means are provided for varying one side of a mechanical triangle according to the distance between the two recorders. A factor proportional to the assumed altitude of the fighter is fed into an electrical differential while the assumed altitude of the target is manually introduced into the same differential. The output of this differential which is proportional to the assumed altitude difference determines the magnitude of a second side of the mechanical triangle. The third side is therefore proportional to the slant range and by means of a suitable transmitting system a potentiometer is positioned in accordance with the magnitude of the slant range as determined by the mechanical triangle. Through the Sanborn echo simulating equipment and the parts of real radar apparatus as explained above the range meter of the radar indicating equipment in the trainer indicates the slant range upon correct manipulation by the radar operator.

The angle which the side of the mechanical triangle representative of slant range makes with the side representative of ground range is introduced into a second electrical differential as the basic component of target elevation angle. Means are provided whereby this basic component may be modified in accordance with the azimuth, banking, diving, and climbing of the fighter to produce a corrective factor which is applied to the target altitude angle to produce target elevation angle. This movement is used to drive a potentiometer which by means of the Sanborn equipment and certain parts of real radar equipment causes the image upon the scope to vary according to the assumed target elevation angle.

An azimuth differential is provided and into one side of this differential is introduced a movement representative of the angle between a line connecting the two recorders and north. Into the secondary side of this differential is introduced a movement representative of the heading of the fighter, the output of this differential being representative of azimuth. The output of this differential is used to actuate a third potentiometer which, through the Sanborn equipment and certain parts of the real radar equipment cause the image upon the scope in the fighter to be positioned in accordance with the assumed target azimuth.

It is apparent that the shown preferred embodiment of my invention may be modified to a great extent without departing from the spirit thereof and, further, that my invention is applicable to many situations other than the interception of an assumed target. For example many parts of my invention may be used in the teaching of students to navigate with respect to a radar beacon or beacons, or with respect to other navigational guides such as radio stations, landscapes as well as moving navigational guides, such as aircraft whose interception is being attempted. Also, my invention may be used in conjunction with types of simulators and radar equipment other than those mentioned herein.

I claim:

1. A training device of the character described for teaching the art of navigation comprising a first member rotatably mounted upon a stationary base and having a seat for a student; a second course simulating member having means of forward movement and being directionally responsive to the movements of said first member about its vertical axis separated from and connected to said first member; a third member adapted to represent a navigational guide, said third member being associated with said second member; mechanical triangulating means; means connected to said mechanical triangulating means and responsive to changes in the distance between said second and third members for changing the length of one side of said triangulating means according to the distance between said second and third members; means for changing the length of a second side of said triangulating means according to an assumed difference in the altitudes of said first member and said navigational guide; means for indicating an assumed distance between said first member and said navigational guide; and means for causing said indicator to register in accordance with the length of the third side of said mechanical triangulating means.

2. A training device of the character described for teaching the art of navigation comprising a first member rotatably mounted upon a stationary base and having a seat for a student; a second course simulating member having means of forward movement and being directionally responsive to the movements of said first member about its vertical axis connected to said first member; a third member adapted to represent a navigational guide, said third member being associated with said second member; mechanical triangulating means; means connected to said mechanical triangulating means and responsive to changes in the distance between said second and third members for changing the length of one side of said triangulating means according to the distance between said second and third members; means for changing the length of a second side of said triangulating means according to an assumed difference in the altitudes of said first member and said navigational guide; a movable element associated with said triangulating means; and means for positioning said element according to the angle between the third and first sides of said triangulating means.

3. In a training device comprising a grounded trainer having a support for a student mounted upon a universal support for pitching and banking with respect to a stationary base, the combination of a pressure containing tank within said trainer; means for varying the pressure within said tank in accordance with an assumed altitude of said trainer; a movable member connected to said tank; means for moving said member in response to changes in the pressure within said tank; a second movable member arranged to be moved by the movements of said first movable member; and means interconnecting each of said members for changing the ratio of movements between said members.

4. A training device of the character described comprising a first supporting member having a seat mounted upon a stationary base; control means in said supporting member simulating the turning controls of a real plane; a second course simulating member having means of forward movement and being directionally responsive to the movements of said simulated control means separated from and connected to said supporting member; a third member adapted to represent a navigational guide, said third member being associated with said second member; mechanical triangulating means; means connected to said mechanical triangulating means and responsive to changes in the distance between said second and third members for changing the length of one side of said triangulating means according to the distance between said second and third members; means for changing the length of a second side of said triangulating means according to an assumed difference in the altitudes of said first member and said navigational guide; means for indicating an assumed distance between said first member and said navigational guide; and means for causing said indicator to register in accordance with the length of the third side of said mechanical triangulating means.

5. A training device of the character described comprising a first supporting member having a seat mounted upon a stationary base; control means in said supporting member simulating the turning controls of a real plane; a second course simulating member having means of forward movement and being directionally responsive to the movements of said simulated control means separated from and connected to said supporting member; a third member adapted to represent a navigational guide, said third member being associated with said second member; mechanical triangulating means; means connected to said mechanical triangulating means and responsive to changes in the distance between said second and third members for changing the length of one side of said triangulating means according to the distance between said second and third members; means for changing the length of a second side of said triangulating means according to an assumed difference in the altitudes of said first member and said navigational guide; indicating means carried by said supporting member; and means for causing said indicating means to register in accordance with the length of the third side of said mechanical triangulating means.

6. A training device of the character described comprising a first supporting member having a seat mounted upon a stationary base; indicating means in said support positioned to be used by a student; mechanical triangulating means; means for changing the length of one side of said mechanical triangulating means according to an assumed distance from said support to a navigational guide; means for changing the length of a second side of said mechanical triangulating means according to an assumed difference in altitude between said support and said navigational guide; and means operatively connecting said indicating means to said mechanical triangulating means for causing said indicating means to register in accordance with the length of the third side of said mechanical triangulating means.

7. A training device of the character described comprising a first supporting member having a seat mounted upon a stationary base; indicating means in said support positioned to be used by a student; mechanical triangulating means; means for changing the length of one side of said mechanical triangulating means according to an assumed distance from said support to a navigational guide; means for changing the length of a second side of said mechanical triangulating means according to an assumed difference in altitude between said support and said navigational guide; and means operatively connecting said indicating means to said mechanical triangulating means for causing said indicating means to register in accordance with the angle between the third and first sides of said triangulating means.

8. A training device of the character described comprising a first supporting member having a seat mounted upon a stationary base; indicating means in said support positioned to be used by a student; mechanical triangulating means; means for changing the length of one side of said mechanical triangulating means according to an assumed distance from said support to a navigational guide; means for changing the length of a second side of said mechanical triangulating means according to an assumed difference in altitude between said support and said navigational guide; and means operatively connecting said indicating means to said mechanical triangulating means for causing said indicating means to register in accordance with both the length of the third side of said mechanical triangulating means and angle between the third and first sides of said triangulating means.

9. A training device comprising a grounded trainer having a support for a student; a tank in said trainer having a controlled variable pressure potential; mechanical triangulating means; means interconnecting said mechanical triangulating means and said tank for changing the length of one of the sides of said mechanical triangulating means in response to changes in the pressure within said tank; indicating means carried by said support; and means interconnecting said indicating means and said mechanical triangulating means for changing the indications of said indicating means in response to changes in the length of said side of said mechanical triangulating means.

10. A training device comprising a grounded trainer having a first supporting member for a student; control means in said supporting means simulating the turning controls of a real plane; a second course simulating member having means of forward movement and being directionally responsive to the movements of said simulated control means separated from and connected to said supporting member; a third member adapted to represent a navigational guide, said third member being associated with said second member; a tank having a controlled variable potential carried by said support; mechanical triangulating means; means for changing the length of one of the sides of said triangulating means according to the distance between said second and third members; means for changing the length of a second side of said triangulating means according to the pressure within said tank; indicating means carried by said support; and means for causing said indicating means to register in accordance with both the length of the third side of said mechanical triangulating means and the angle between said first and third sides.

RAYMOND E. KITTREDGE.